(12) United States Patent
Kuhl

(10) Patent No.: US 9,155,416 B1
(45) Date of Patent: Oct. 13, 2015

(54) GRILL AND FIRE PIT

(76) Inventor: Ronald W. Kuhl, Louisville, KY (US)

( * ) Notice: Subject to any disclaimer, the term of this patent is extended or adjusted under 35 U.S.C. 154(b) by 986 days.

(21) Appl. No.: 13/183,547

(22) Filed: Jul. 15, 2011

(51) Int. Cl.
*A47J 27/12* (2006.01)
*A47J 27/13* (2006.01)
*A47J 37/00* (2006.01)

(52) U.S. Cl.
CPC ...................................... *A47J 27/12* (2013.01)

(58) Field of Classification Search
USPC .............. 126/25 R, 9 R, 340, 38, 37 B, 41 D; 99/401, 340, 402, 393, 467, 481, 482
See application file for complete search history.

(56) References Cited

U.S. PATENT DOCUMENTS

| | | | |
|---|---|---|---|
| 2,608,190 A * | 8/1952 | Winning et al. | 126/25 A |
| 3,851,639 A | 12/1974 | Beddoe | |
| 4,321,857 A | 3/1982 | Best | |
| 4,512,249 A * | 4/1985 | Mentzel | 99/352 |
| 4,569,327 A * | 2/1986 | Velten | 126/25 A |
| 4,934,260 A | 6/1990 | Blevins | |
| 4,962,696 A | 10/1990 | Gillis | |
| 5,184,599 A | 2/1993 | Stuart | |
| 5,473,979 A * | 12/1995 | Ruben | 99/446 |
| 5,536,518 A | 7/1996 | Rummel | |
| 5,564,330 A | 10/1996 | Nowicke | |
| 5,711,209 A | 1/1998 | Guines | |
| 6,314,955 B1 | 11/2001 | Boetcker | |
| 6,321,640 B1 * | 11/2001 | Tseng | 99/340 |
| 6,439,225 B2 * | 8/2002 | Bach et al. | 126/519 |
| 6,708,604 B1 | 3/2004 | Deichler | |
| 6,748,939 B1 | 6/2004 | Gober | |
| 6,820,538 B2 | 11/2004 | Roescher | |
| 6,874,496 B2 | 4/2005 | Waits et al. | |
| 6,913,011 B1 | 7/2005 | Snider | |
| 7,159,509 B2 | 1/2007 | Starkey | |
| 7,188,617 B1 | 3/2007 | O'Blenes | |
| 7,540,233 B1 | 6/2009 | Grice | |
| 7,798,139 B2 | 9/2010 | Gagas et al. | |
| 8,079,302 B2 * | 12/2011 | Giangrasso et al. | 99/449 |
| 8,739,380 B1 * | 6/2014 | Montgomery | 29/401.1 |
| 2004/0000303 A1 | 1/2004 | Regen et al. | |
| 2004/0123857 A1 | 7/2004 | Viraldo | |
| 2005/0121018 A1 * | 6/2005 | Rosen | 126/9 R |
| 2005/0155498 A1 * | 7/2005 | Killion | 99/482 |
| 2006/0011192 A1 | 1/2006 | Citrynell et al. | |
| 2008/0098906 A1 * | 5/2008 | Davis | 99/482 |
| 2009/0199839 A1 * | 8/2009 | Hulsey | 126/25 A |
| 2009/0314277 A1 | 12/2009 | Marsh | |
| 2010/0269713 A1 | 10/2010 | Foster | |
| 2012/0318255 A1 * | 12/2012 | Brown | 126/25 R |

* cited by examiner

*Primary Examiner* — Steven B McCallister
*Assistant Examiner* — Desmond C Peyton
(74) *Attorney, Agent, or Firm* — Camoriano and Associates

(57) ABSTRACT

A multi-purpose grill which easily can be converted for use as a conventional grill and as an open fire pit by selectively opening and closing a movable covering.

12 Claims, 35 Drawing Sheets

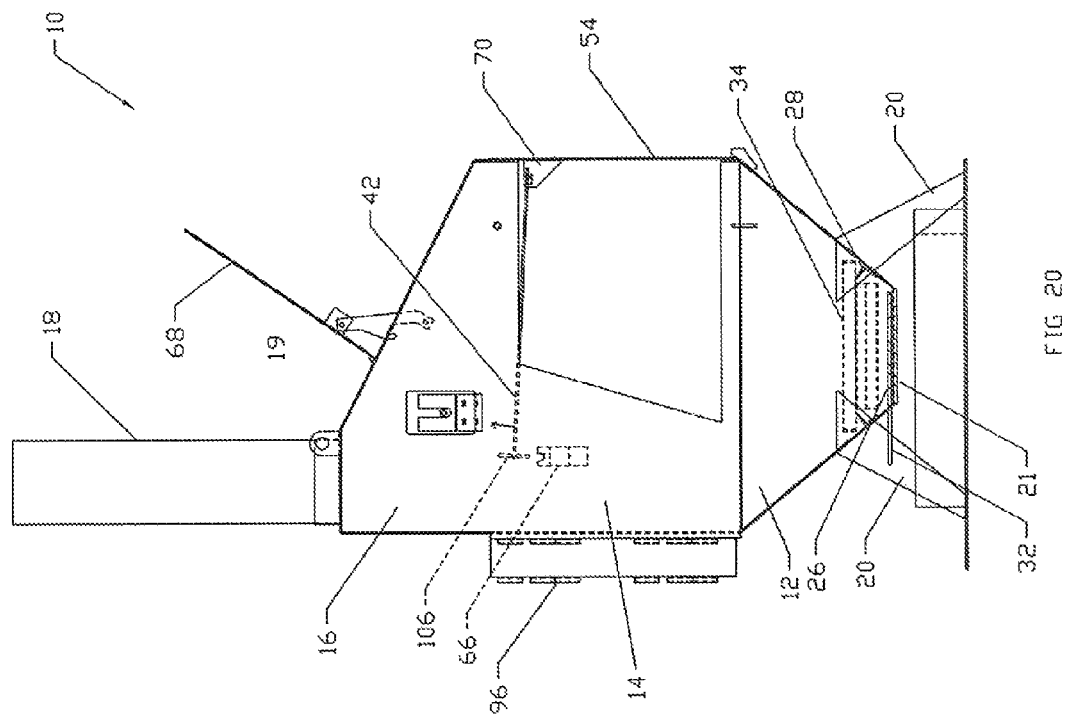

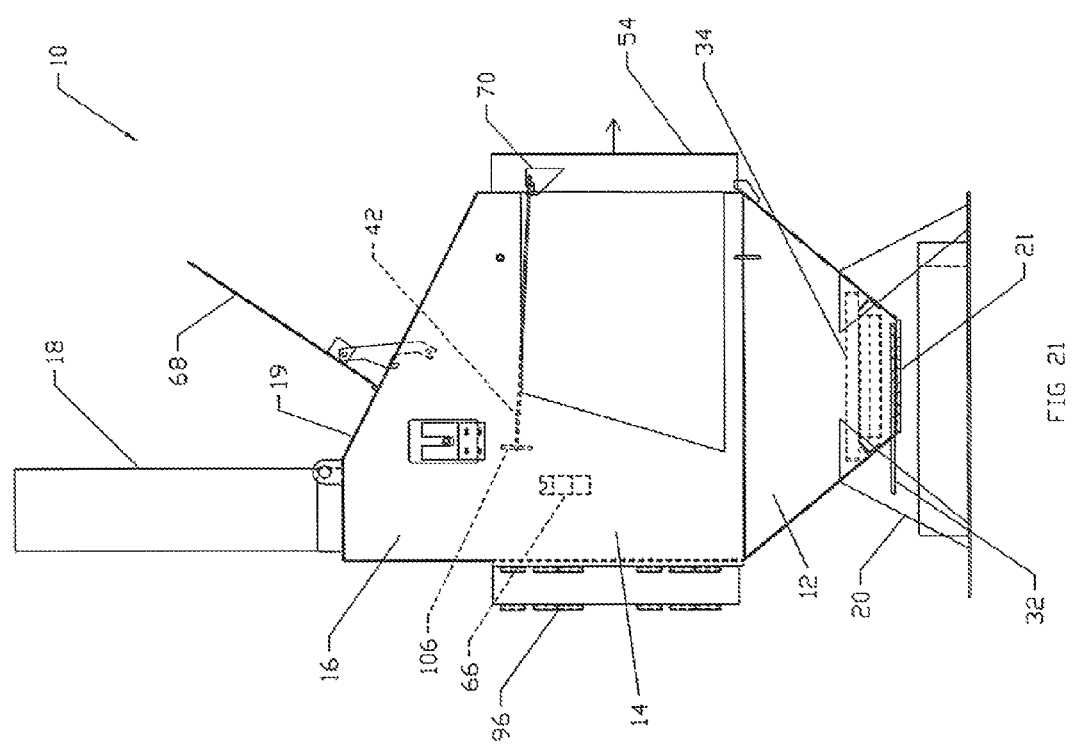

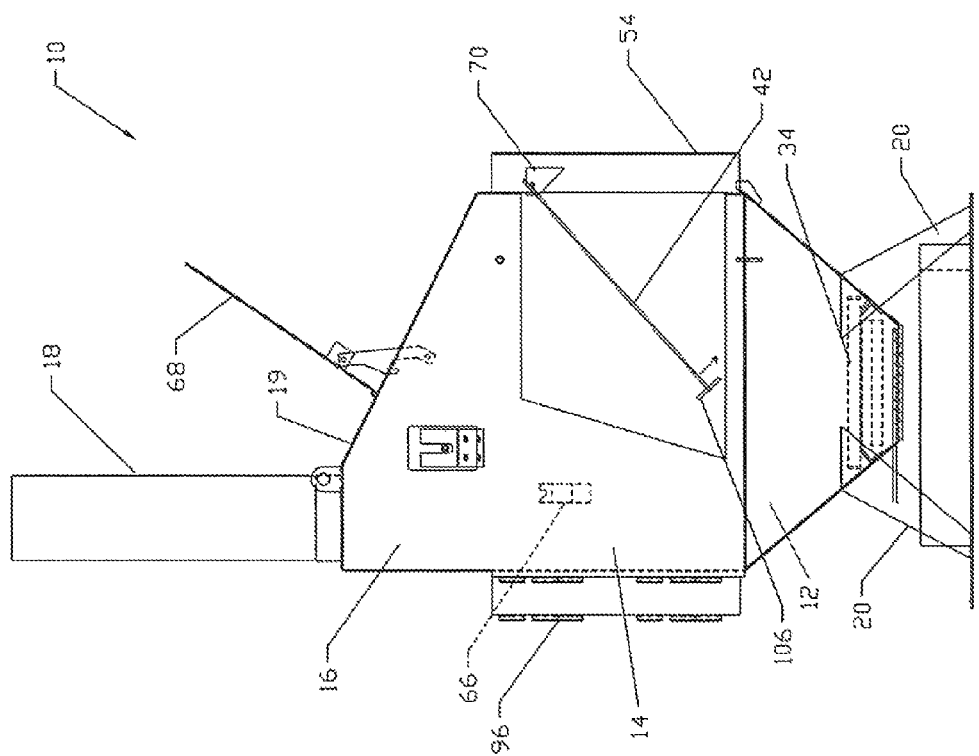

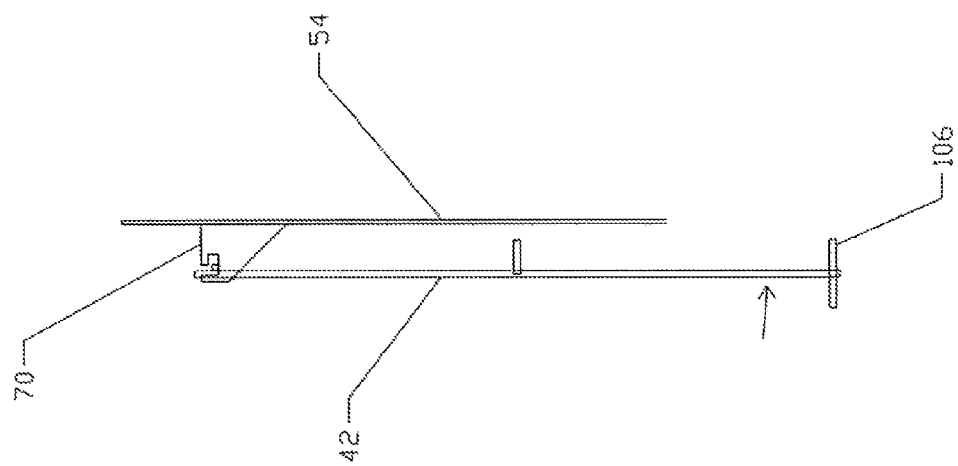

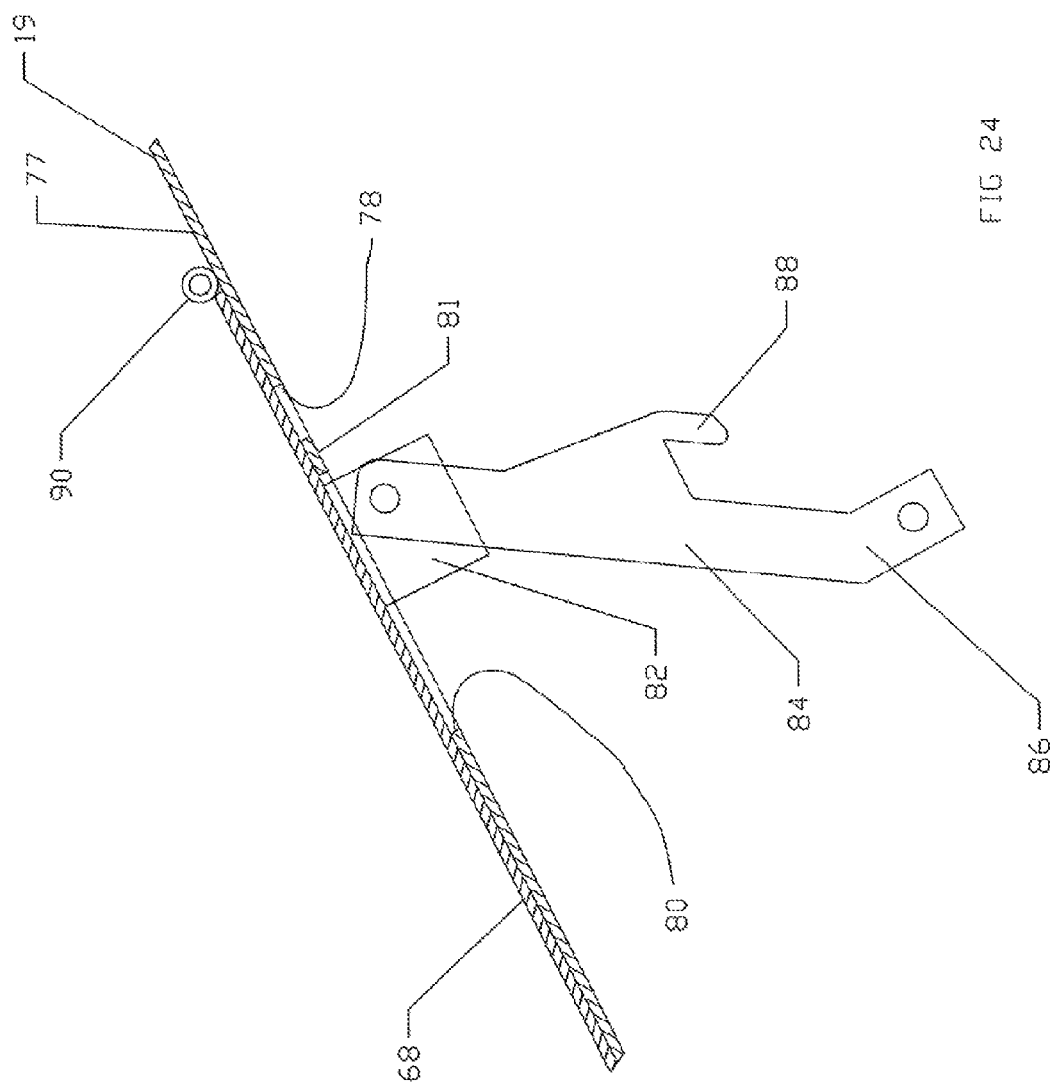

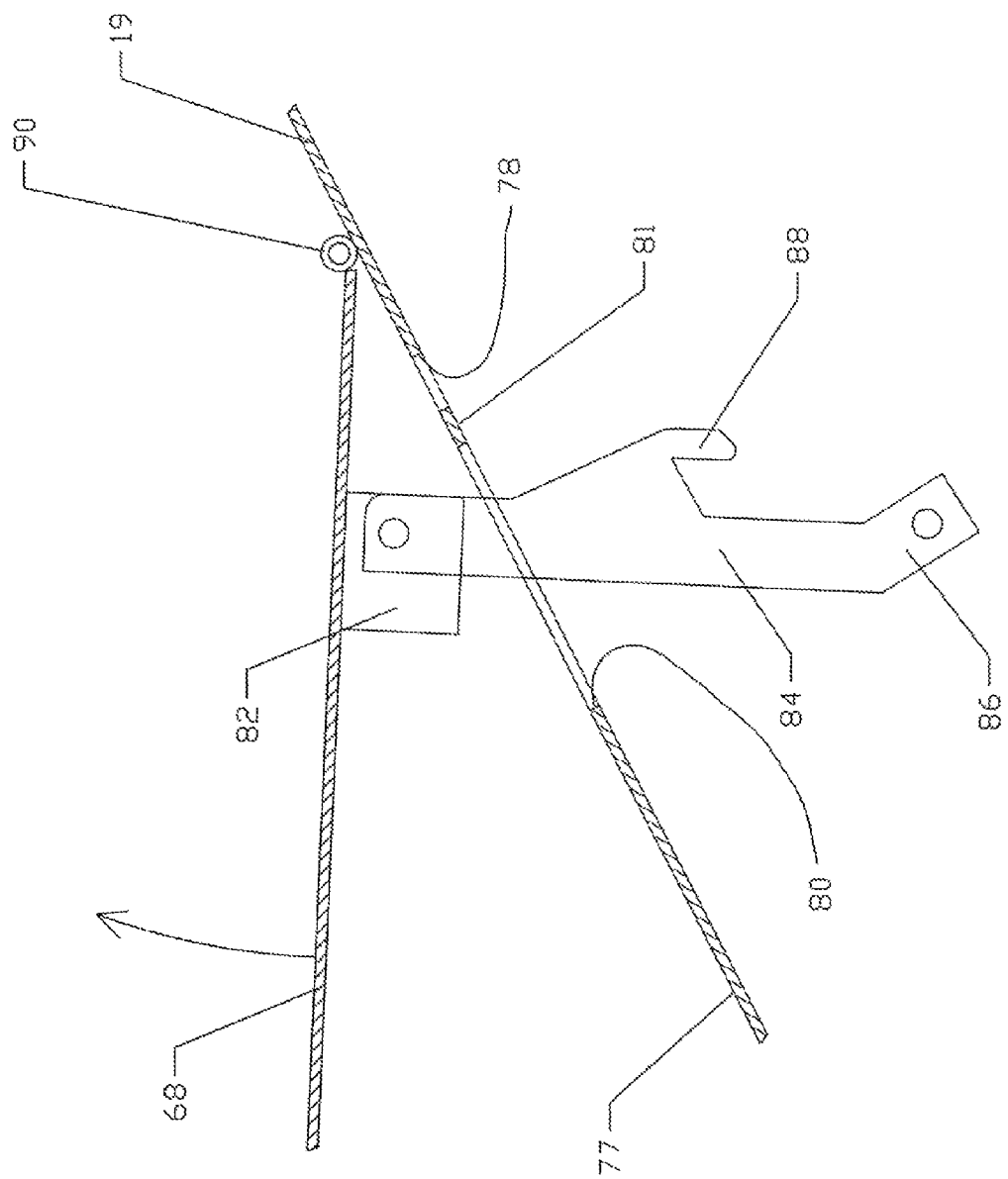

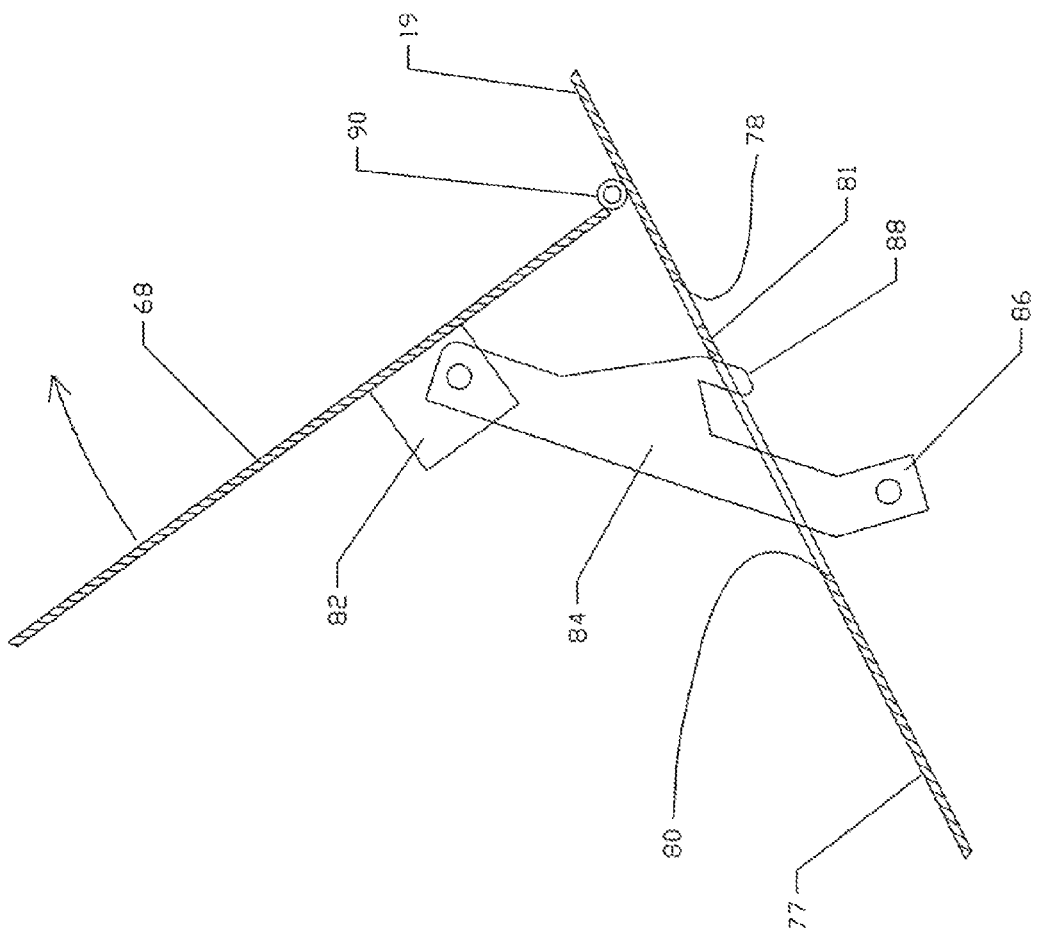

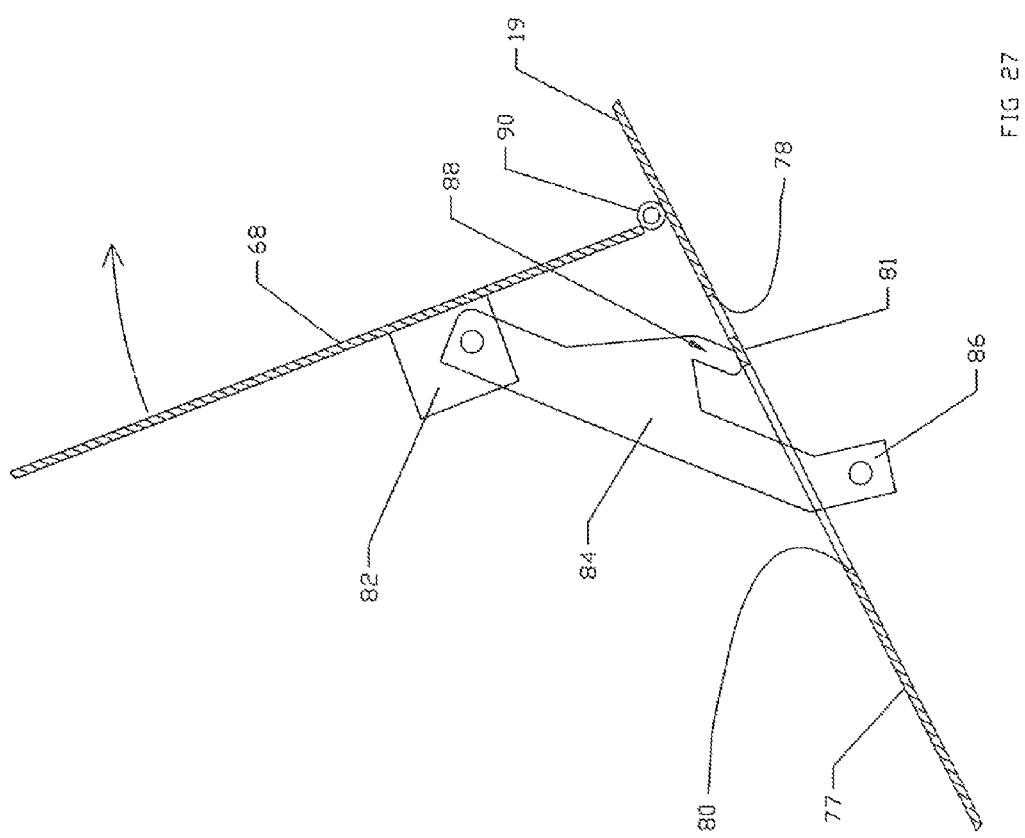

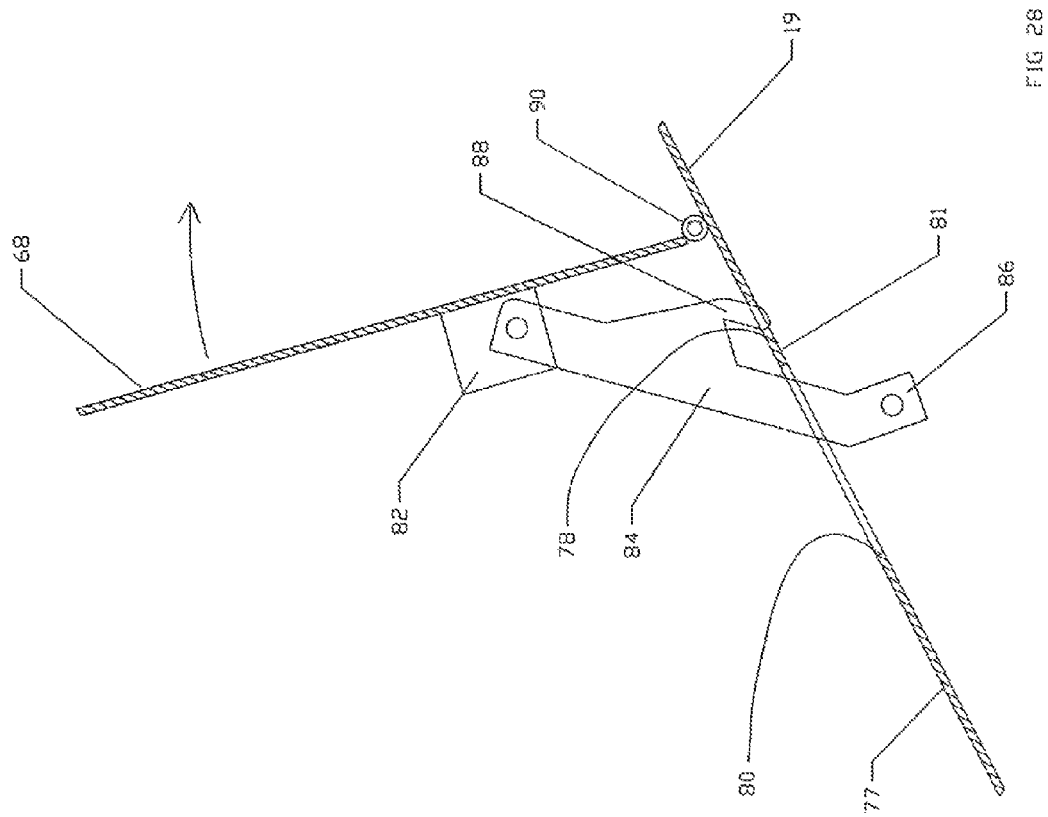

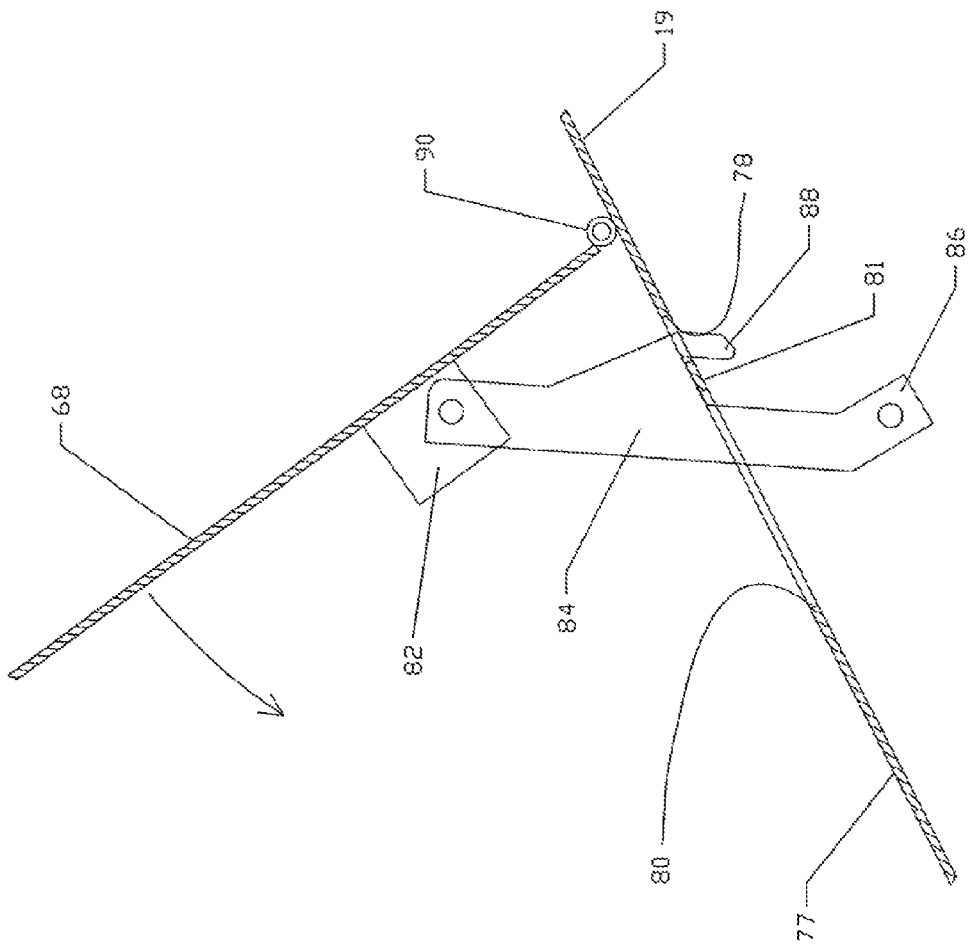

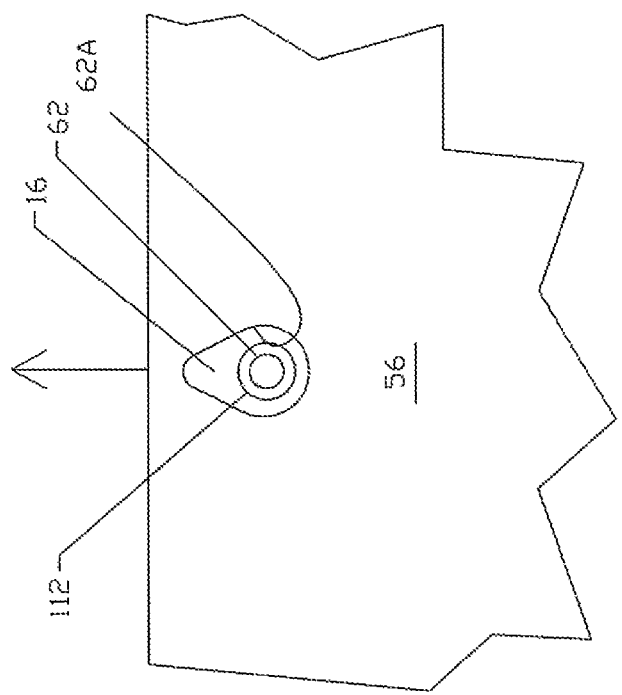
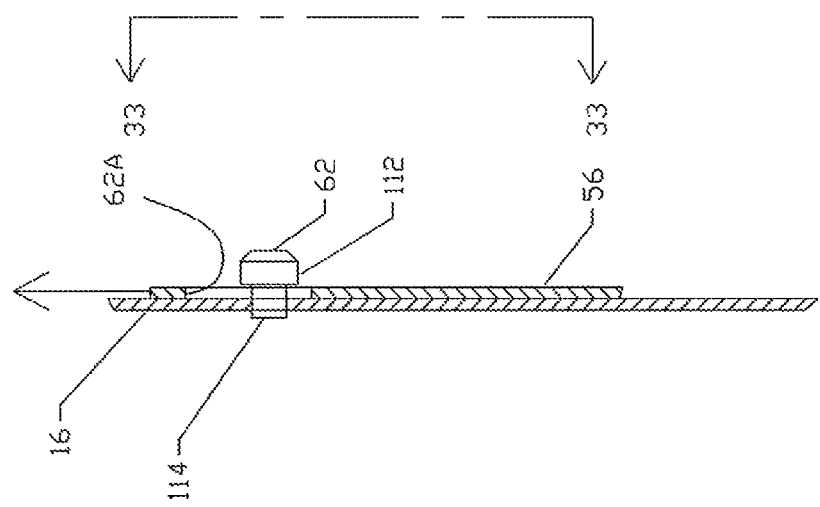
FIG. 33
FIG. 32

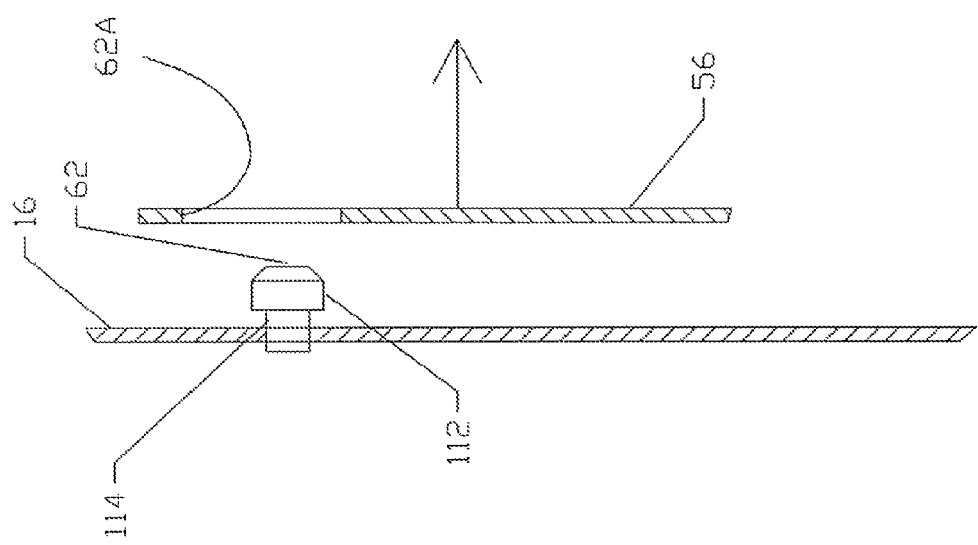

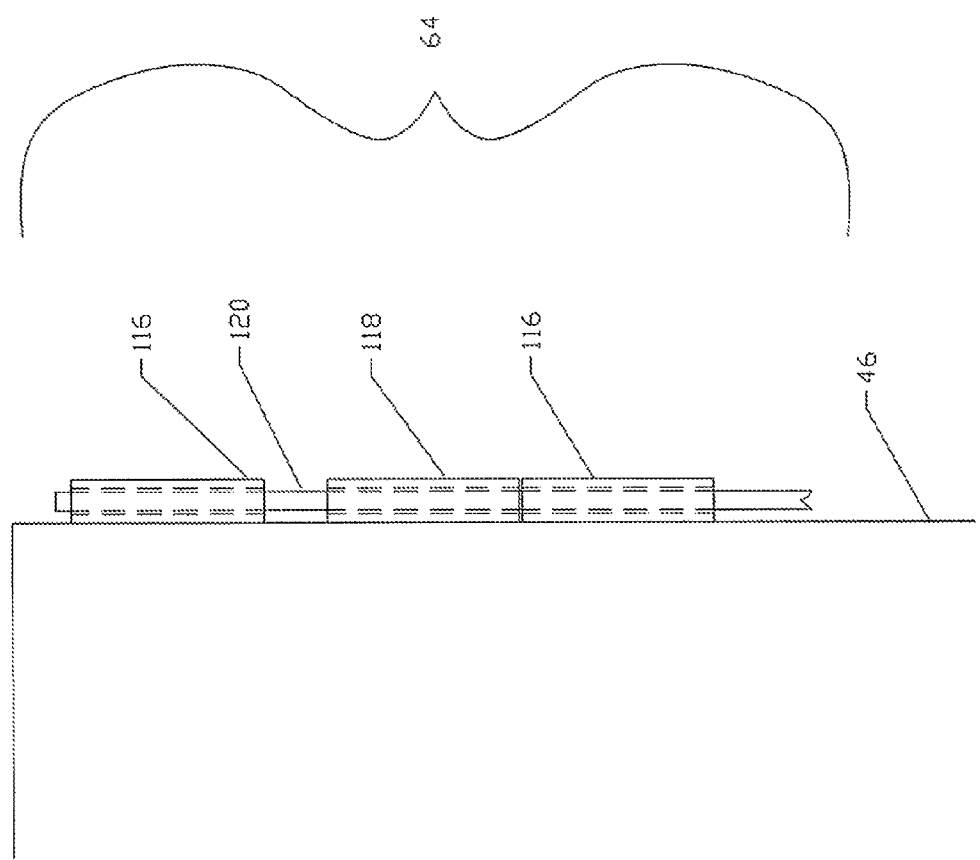

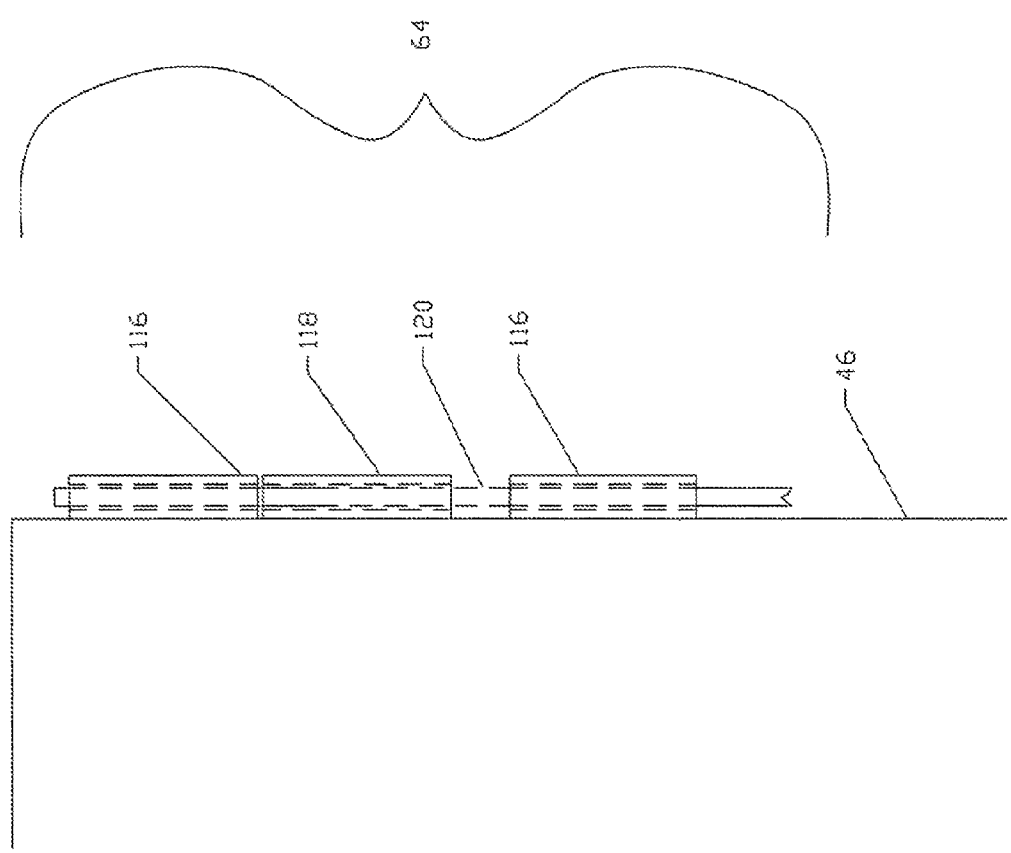

GRILL AND FIRE PIT

BACKGROUND

The present invention relates to an outdoor grill which easily can be converted to serve as an open fire pit by selectively moving a movable covering to open and close a vertical gap between the upper body portion of the grill and the base of the grill.

BRIEF DESCRIPTION OF THE DRAWINGS

FIG. 20 is a left side view, similar to FIG. 19, but showing a first step in the removal of the cooking grid;

FIG. 21 is a left side view, similar to FIG. 20, but showing a next step in the removal of the grid;

FIG. 22 is a left side view, similar to FIG. 21, but showing another step in the removal of the grid;

FIG. 23 is a view along line 23-23 of FIG. 14;

FIG. 24 is a broken-away, section view along line 24-24 of FIG. 8;

FIG. 25 is a view similar to FIG. 24, but showing a first step in the opening of the grill lid;

FIG. 26 is a view similar to FIG. 25, but showing a further step in the opening of the grill lid;

FIG. 27 is a view similar to FIG. 26, but showing another step in the opening of the grill lid;

FIG. 28 is a view similar to FIG. 27, but showing another step in the opening of the grill lid;

FIG. 29 is a view similar to FIG. 28, but showing a final step in the opening of the grill lid;

FIG. 32 is a view similar to FIG. 30 but after the cover 56 has been lifted in preparation for swinging it around;

FIG. 33 is a broken-away view along line 33-33 of FIG. 32;

FIG. 34 is a view similar to FIG. 32 but after the cover 56 has been lifted and separated from the button 62;

FIG. 36 is a broken-away section view along line 36-36 of FIG. 2; and

FIG. 37 is a view similar to FIG. 36 but after the cover 52 has been lifted in preparation for swinging it around.

DESCRIPTION

FIGS. 1-4 show a convertible grill 10. The grill 10 includes a base 12, which is made up of a body having a bottom, and front, rear, left and right sides, and is supported by four legs 20 which elevate the base 12 off of the ground. The base 12 has planar, trapezoidal left, right, front and rear walls, which form a body with a rectangular horizontal cross-section, tapering from a larger rectangle at the top to a smaller rectangle at the bottom, and with a sliding rectangular plate 21 (See FIG. 20) enclosing the bottom. It forms a concave upper surface for receiving and supporting a material to be burned, such as wood or charcoal.

Figure 8:
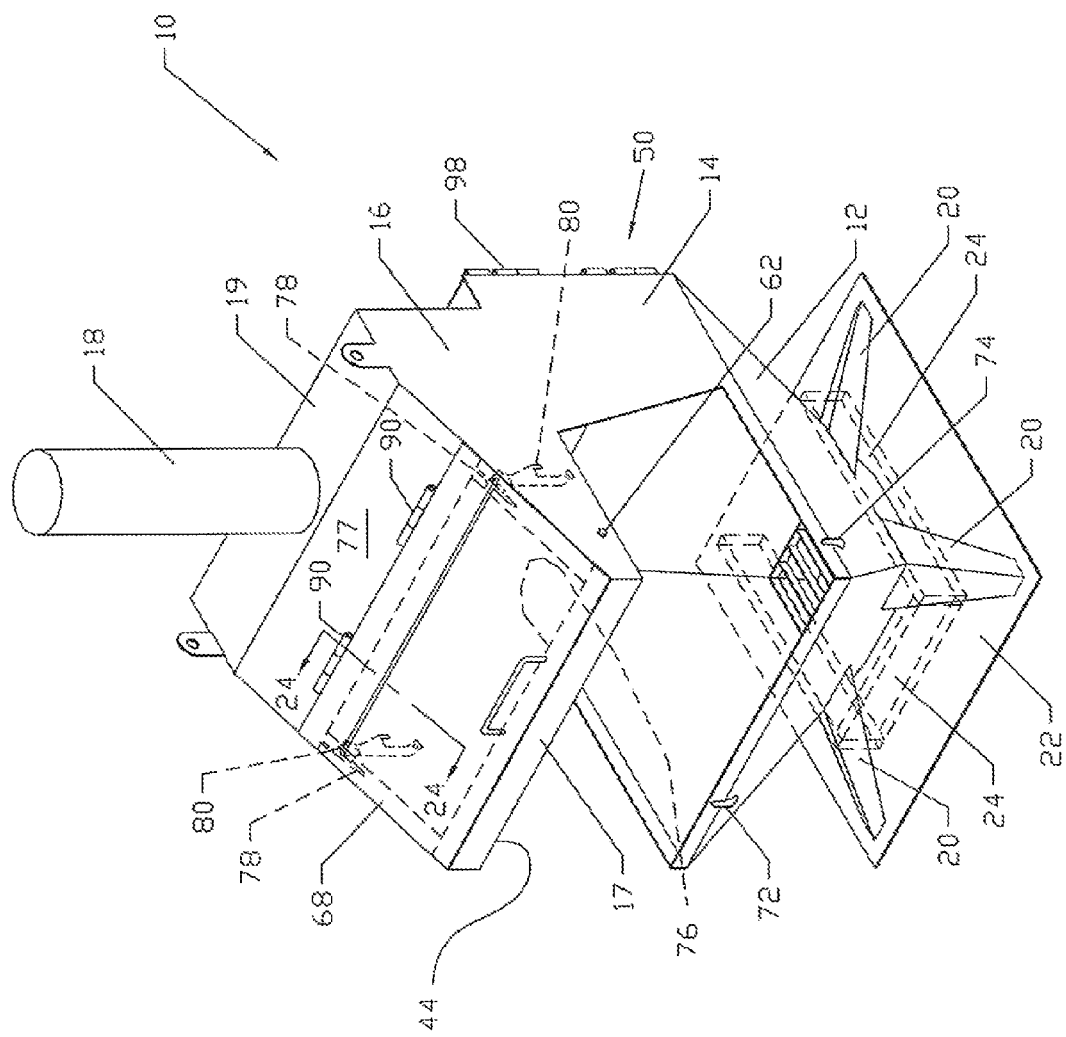
FIG. 8 is a right front perspective view of the grill of FIG. 1, but opened up into the open fire pit configuration.
Figure 9:
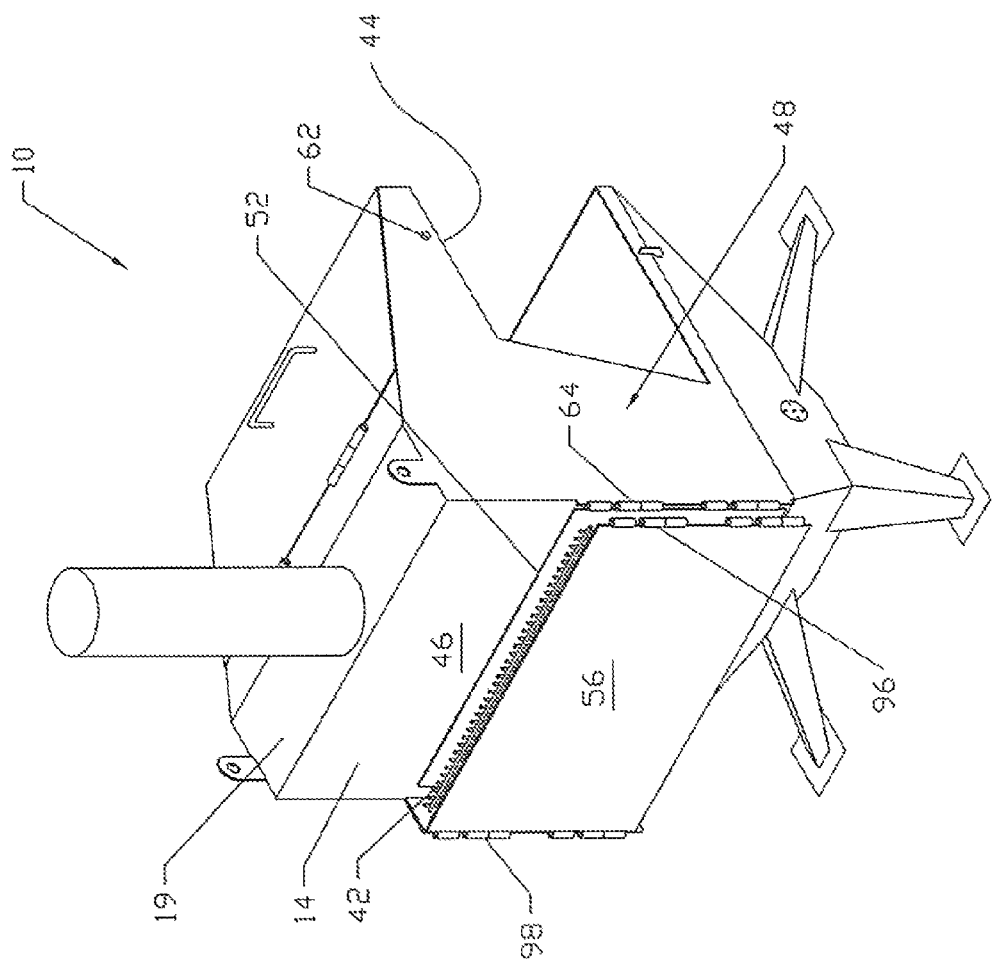
FIG. 9 is a left rear perspective view of the grill in the open fire pit configuration of FIG. 8.

An upper body portion 16 is supported on and fixed to the base 12 by means of a fixed wall 14, which spans across the entire rear of the base 12 and extends partway along the rear portions of the right and left sides 50, 48 (See FIGS. 8 and 9). The upper body portion 16 is spaced above the base 12 by means of the fixed wall 14 so as to define a vertical gap 44 between the upper body portion 16 and the base 12 across the entire front and along the forward portions of the left and right sides.

The upper body portion 16 also forms a body with a rectangular horizontal cross-section, tapering from a larger rectangle at the bottom to a smaller rectangle at the top. In this embodiment, the rectangular cross-section of the bottom of the upper body portion 16 is the same as the rectangular cross-section of the top of the base 12, with the bottom of the upper body portion 16 lying directly vertically above and aligned with the top of the base 12. The upper body portion 16 has a rectangular rear wall, a smaller rectangular front wall 17, trapezoidal side walls, and a top wall 19, all of which are fixed relative to the fixed wall 14.

The upper body portion 16 includes a smokestack 18 at the highest elevation portion of its top wall 19 to direct and vent exhaust gas and smoke from the grill 10.

The base 12 is supported by four legs 20, which elevate the base 12 off of the ground. As best appreciated in FIG. 8, the legs 20 may be mounted on a flat platform 22, which may further include elongated elements 24 to contain ashes once the ashes have been ejected from the grill 10.

Figure 15:
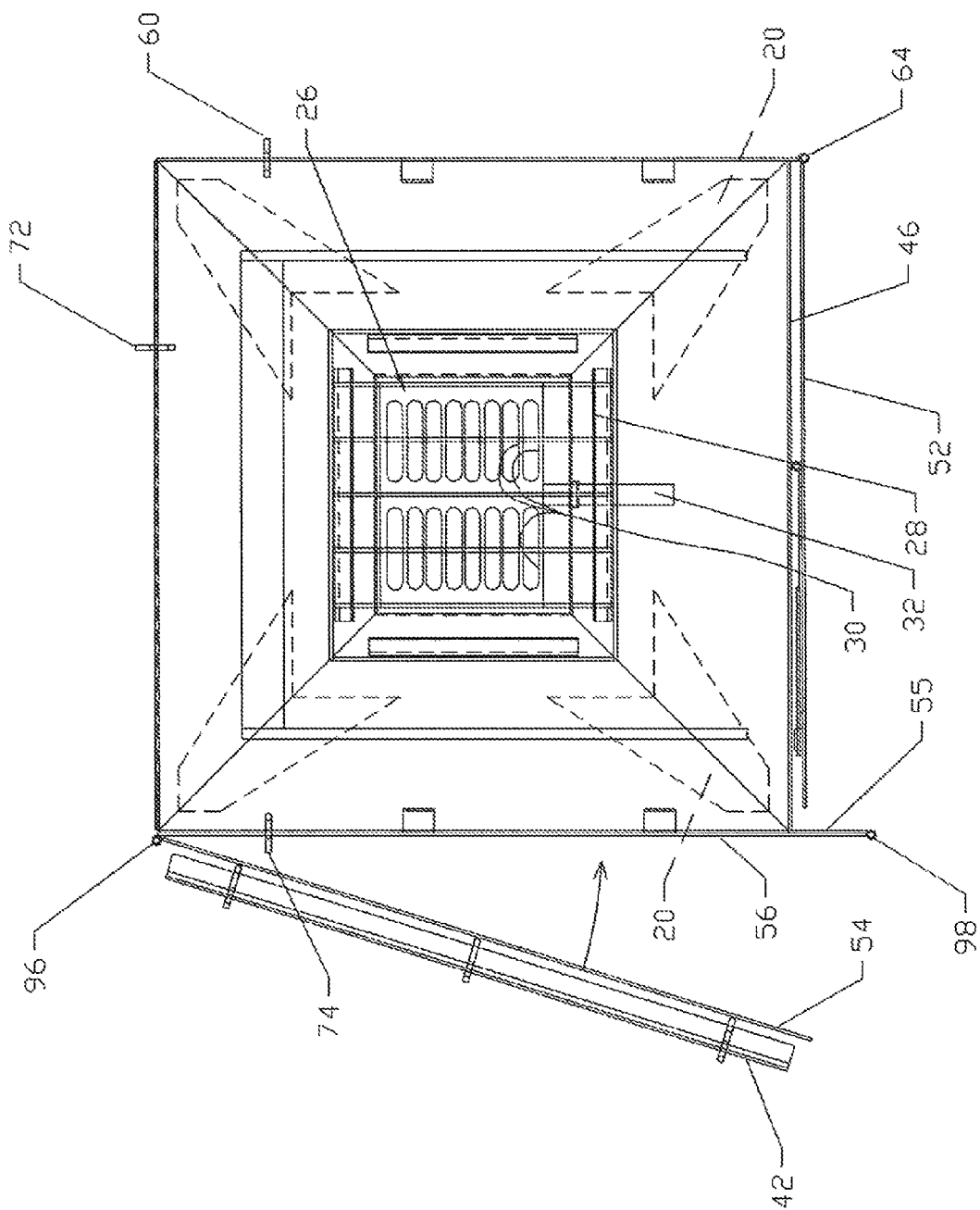
FIG. 15 is a view similar to FIG. 14, but showing another step in the opening of the grill into the open fire pit configuration.
Figure 19:
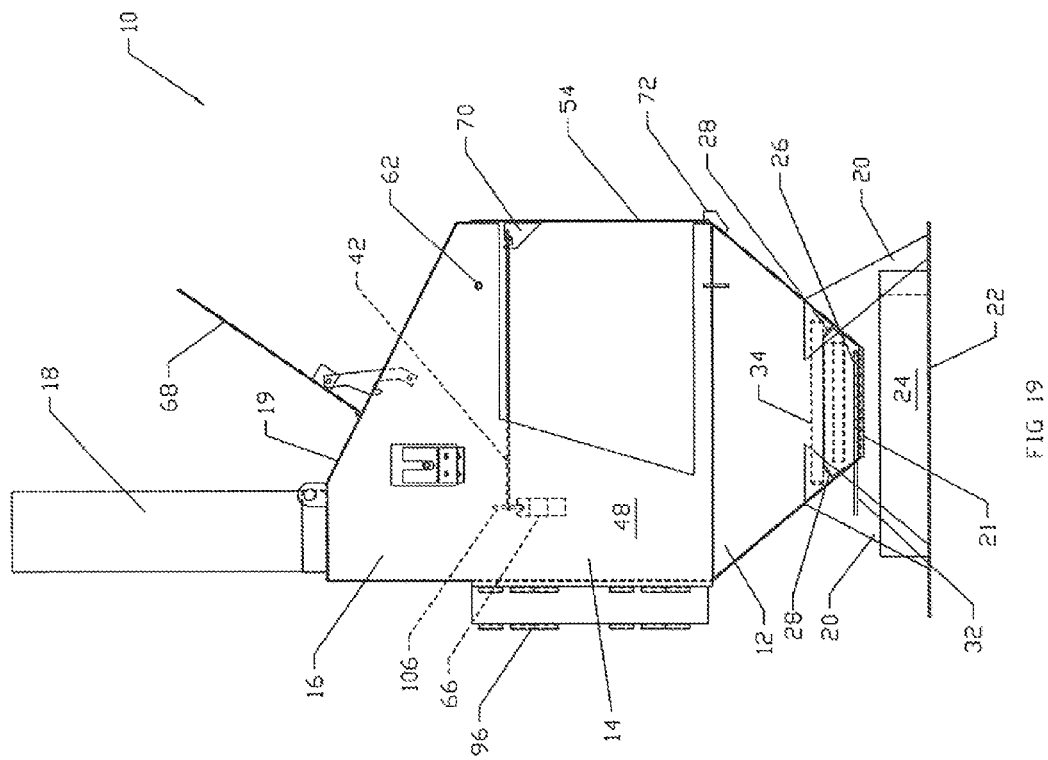
FIG. 19 is a left side view of the grill as shown in FIG. 13, after the left side wall has been opened to convert the grill to the open fire pit configuration, but before the cooking grid has been removed.
Figure 31:
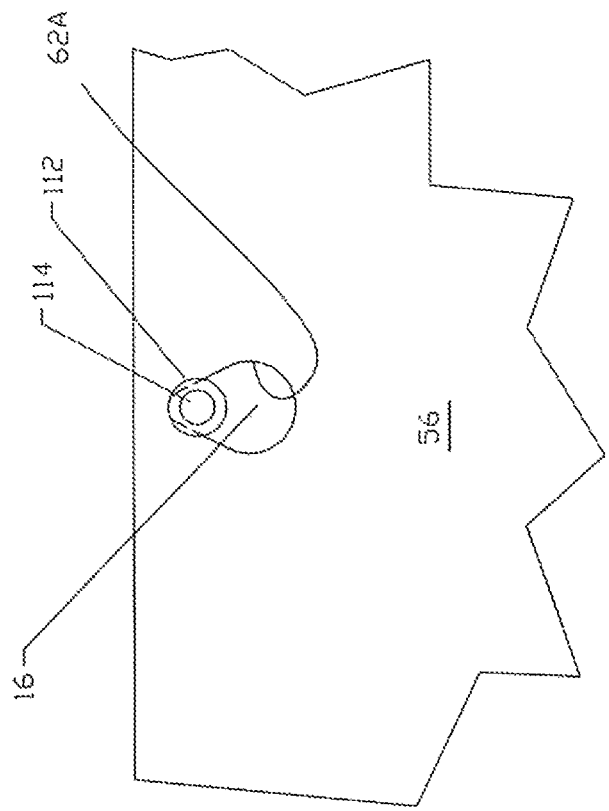
FIG. 31 is a broken-away, view along line 31-31 of FIG. 30.
Figure 30:
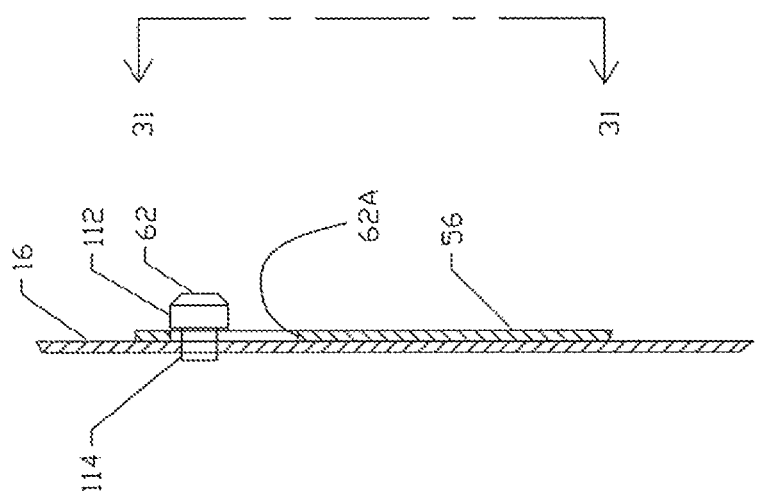
FIG. 30 is a broken-away, section view along line 30-30 of FIG. 1.

Referring to FIGS. 15 and 19, the base 12 includes an upper horizontal plate 26 and a lower horizontal plate 21, with the upper plate 26 lying on top of the lower plate 21. Each of the upper and lower plates 26, 21 defines a plurality of slotted openings 30, and the upper plate 26 can be slid forward and backward relative to the lower plate 21 to move their corresponding slotted openings 30 into and out of alignment with each other, which provides openings that allow combustion air to enter the grill 10, or which closes off those openings, or provides an intermediate sized opening, thereby controlling the amount of combustion air allowed to enter the grill 10.

If the grill is to be used as a conventional grill, the slotted openings 30 would be substantially aligned to provide good air flow (with the vertical gaps between the walls of the upper portion 16 and the base 12 closed). If the grill is to be used as a smoker, the slotted openings 30 would be adjusted to be almost completely closed.

A bar 32 is secured to the upper sliding plate 26 and is used as a handle that is grasped by the operator to adjustably open or close the slotted openings 30 to control the amount of combustion air allowed into the grill 10. It should be noted that the slotted openings 30 also may be used to remove the ashes from the base 12, with the user moving the top plate 26 relative to the bottom plate 21, or brushing the ashes along the bottom of the base 12. so the ashes fall though the openings 30. While, in this embodiment, it is the upper plate 26 that moves, it could be the lower plate 21, or some other known adjustable venting arrangement could be used.

Angle irons 28 are secured to the front, back, left and right sides of the base above the upper plate 26. A log grid 34 rests on top of the angle irons 28 and is used to support the fuel (logs or charcoal) while allowing air to circulate around the fuel. In the grill configuration shown in FIGS. 2 and 3, a fuel access door 36 can be opened to provide access to the log grid 34 area in order to add fuel to the fire. The fuel access door 36 is hinged on one side, and it is opened by lifting a latch mechanism 38 (shown in FIG. 2) and swinging the door 36 open to pivot about a vertical hinge as shown in FIG. 3. The opening 116 is large enough to permit logs to be inserted through the door 36.

Figure 2:
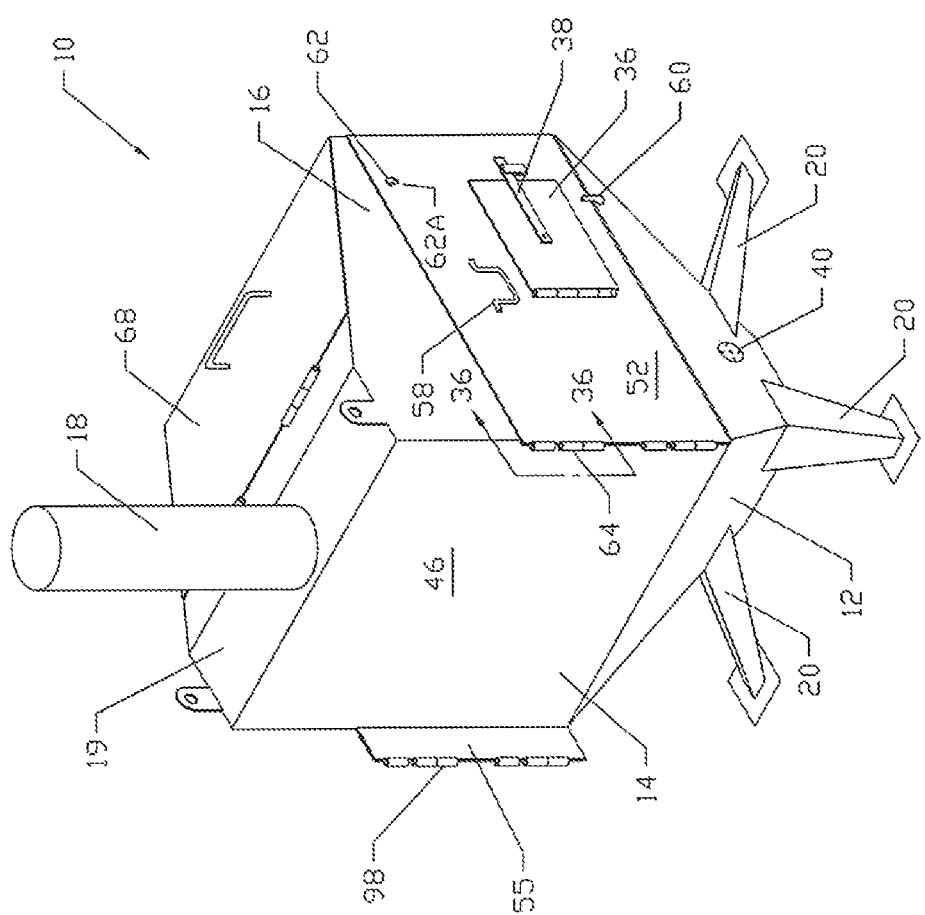
FIG. 2 is a left rear perspective view of the grill of FIG. 1.
Figure 3:
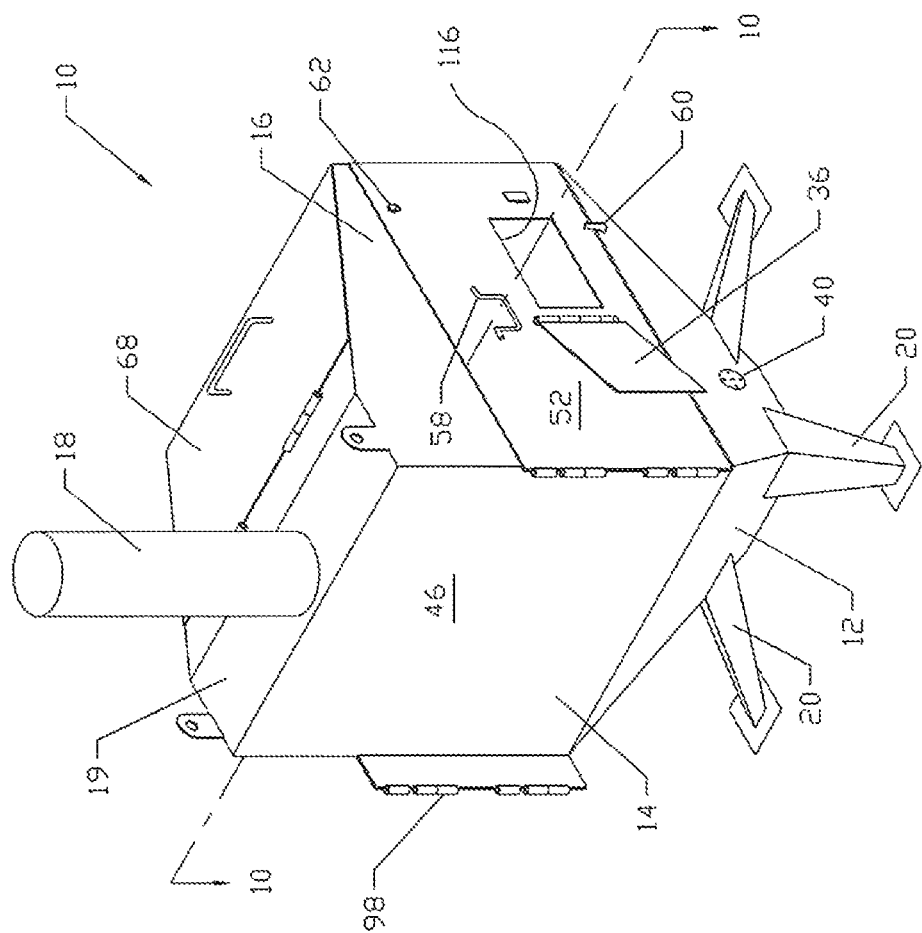
FIG. 3 is the same view as FIG. 2, but with the fuel access door open.

Referring to FIGS. 2 and 3, the base 12 also includes an air vent mechanism 40 to fine tune the amount of combustion air. This is a rotatable wheel with four openings which is secured to the side wall of the base 12. The side wall has four corresponding openings, and rotation of the wheel aligns the openings in the wheel with the openings in the wall to a greater or lesser degree, from complete alignment (which provides the largest air passage) to complete misalignment (which provides no air passage).

Referring now to FIGS. 8 and 9, the fixed wall portion 14 of the grill 10 defines a large vertical gap 44, extending completely across the front of the grill 10 and extending rearwardly most of the distance from the front to the back on both the left and right sides. The fixed wall portion 14 includes a rear wall 46 and left and right side walls 48, 50, which lie at right angles to the rear wall 46, and which are aligned with and attached, as by welding, to the left and right side walls and rear wall of the base 12. The fixed wall portion 14 also forms part of the upper body portion 16, which is spaced above the base 12.

The large vertical gap 44 is closed with hinged covers when in the grill configuration, as discussed below.

Figure 1:
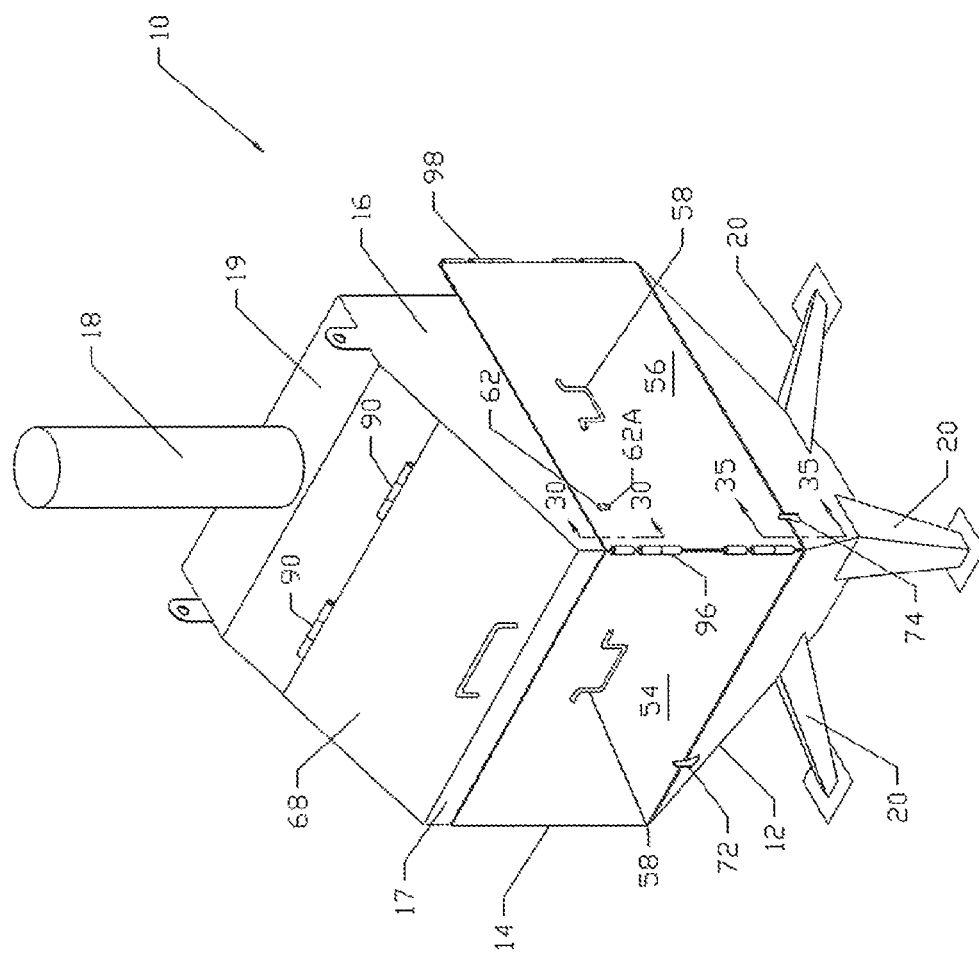
FIG. 1 is a right front perspective view of a grill in the fully enclosed configuration.
Figure 10:
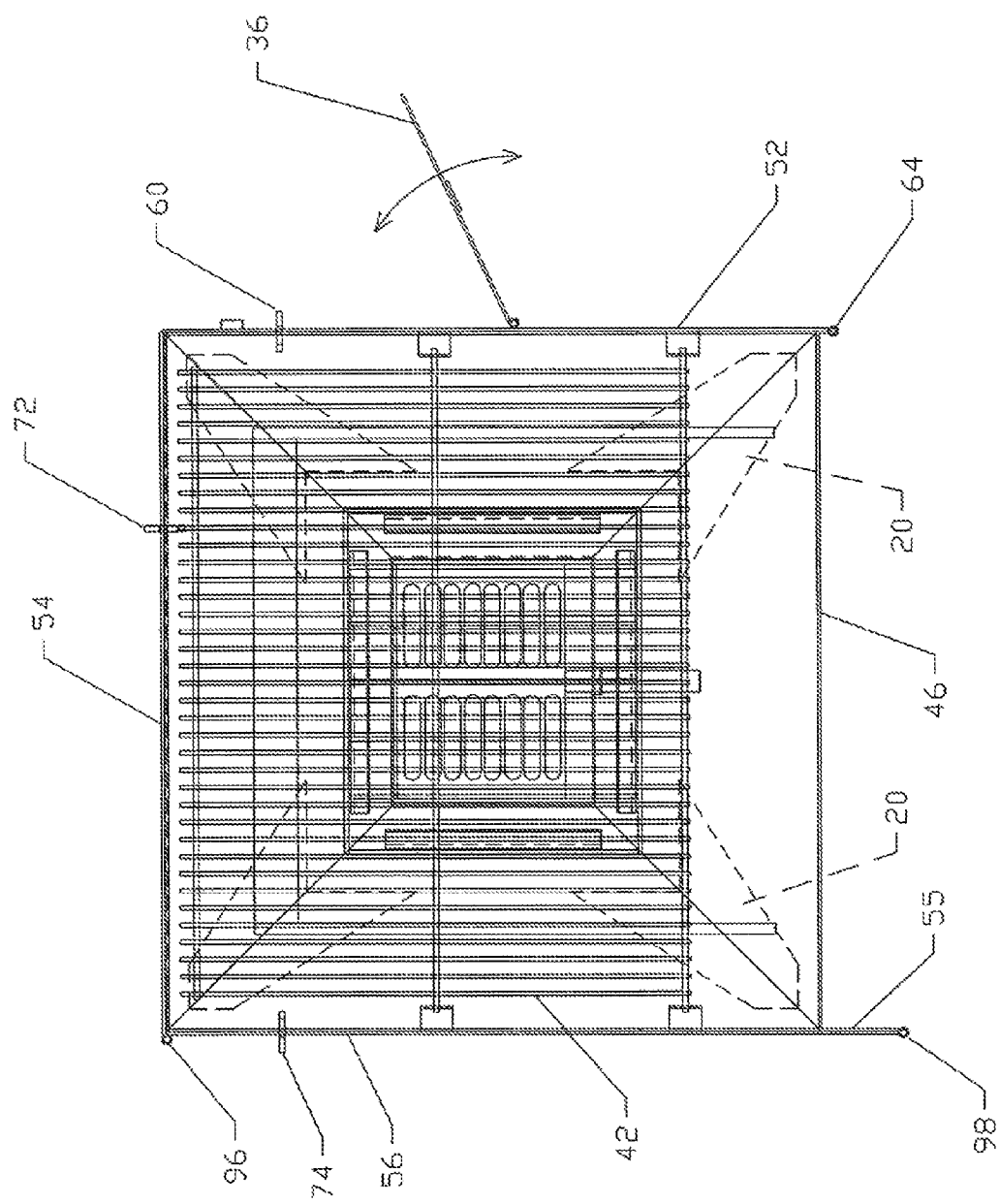
FIG. 10 is a view along line 10-10 of FIG. 3.

Referring now to FIGS. 1, 2 and 10, there are hinged covers, which can be moved to open and close the vertical gap 44 between the upper body portion 16 and the base 12. A left cover 52 is pivotably mounted to the left side of the rear wall 46, pivoting about a vertical hinge 64; a front cover 54 is pivotably mounted to the right cover 56, pivoting about a vertical hinge 96; and a right cover 56 is pivotably mounted to a plate 55, which is fixed to and projects rearwardly from the right side of the rear wall 46, pivoting about a vertical hinge 98. Each of these covers 52, 54, 56 has a handle 58 to help the user in slightly lifting and handling its corresponding cover. The fuel access door 36, which was mentioned earlier, is mounted on the left cover 52 and covers an opening defined by the left cover 52.

There are buttons 62 on the left and right sides of the upper body portion 16 and upwardly projecting tabs 60, 72, 74 on the base 12 that hold the covers 52, 54, 56 inwardly against the fixed base 12 and upper body portion 16 of the grill 10.

Referring to FIGS. 30-34, the buttons 62 have an enlarged head 112 and a smaller diameter shank 114, with the end of the shank 114 being secured, as by welding, to the upper body portion 16. The left and right side covers 52, 56 each have a keyhole opening 62A that has a larger diameter at the bottom and a smaller diameter at the top. The larger diameter bottom portion of the keyhole opening 62A is large enough to receive the head 112 of the button 62, while the smaller diameter top portion of the keyhole opening 62A is large enough to receive the shank 114 but not the head 112. When the covers are closed, the smaller diameter, upper portions of the keyholes 62A on the left and right side covers 52, 56 are aligned with the buttons 62, and the shanks 114 of the buttons 62 are extending through the smaller diameter portions of the keyholes 62A, with the inner surfaces of the heads 112 of the buttons 62 abutting the respective outer surfaces of the left and right side covers to hold them inwardly and prevent them from separating from the fixed portions of the grill 10.

Figure 35:
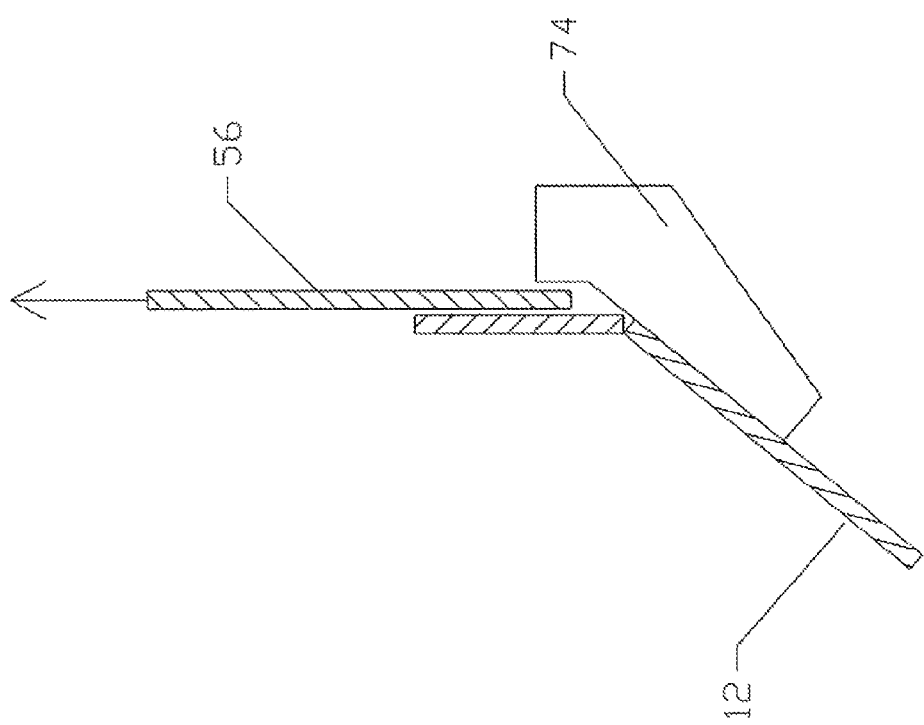
FIG. 35 is a broken-away section view along line 35-35 of FIG. 1.

Referring to FIG. 35, the upwardly projecting tabs 60, 72, 74 bear against the outer surface adjacent the bottom edge of the respective covers 52, 54, 56 to hold them inwardly and prevent them from separating from the fixed portions of the grill 10.

To convert the grill 10 from the fully enclosed grill configuration shown in FIG. 1, with the vertical gap between the upper body portion 16 and the base 12 fully closed, to the open fire pit configuration shown in FIG. 8, with the front and most of the left and right sides open between the upper body portion 16 and the base 12, the first step is to stow the left cover 52 against the rear wall 46 of the grill 10.

Figure 11:
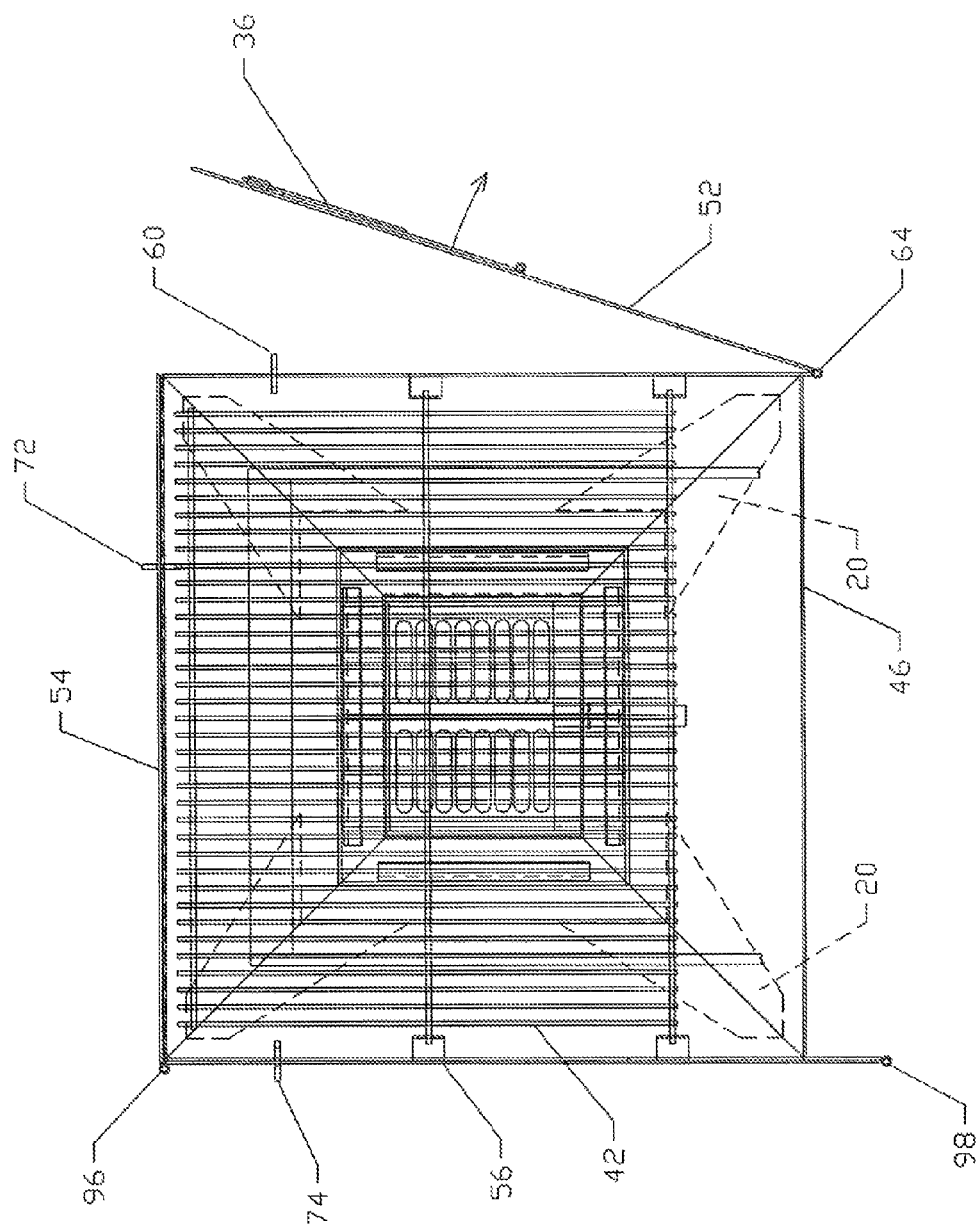
FIG. 11 is a view similar to FIG. 10, but showing a first step in the opening of the grill into the open fire pit configuration.
Figure 12:
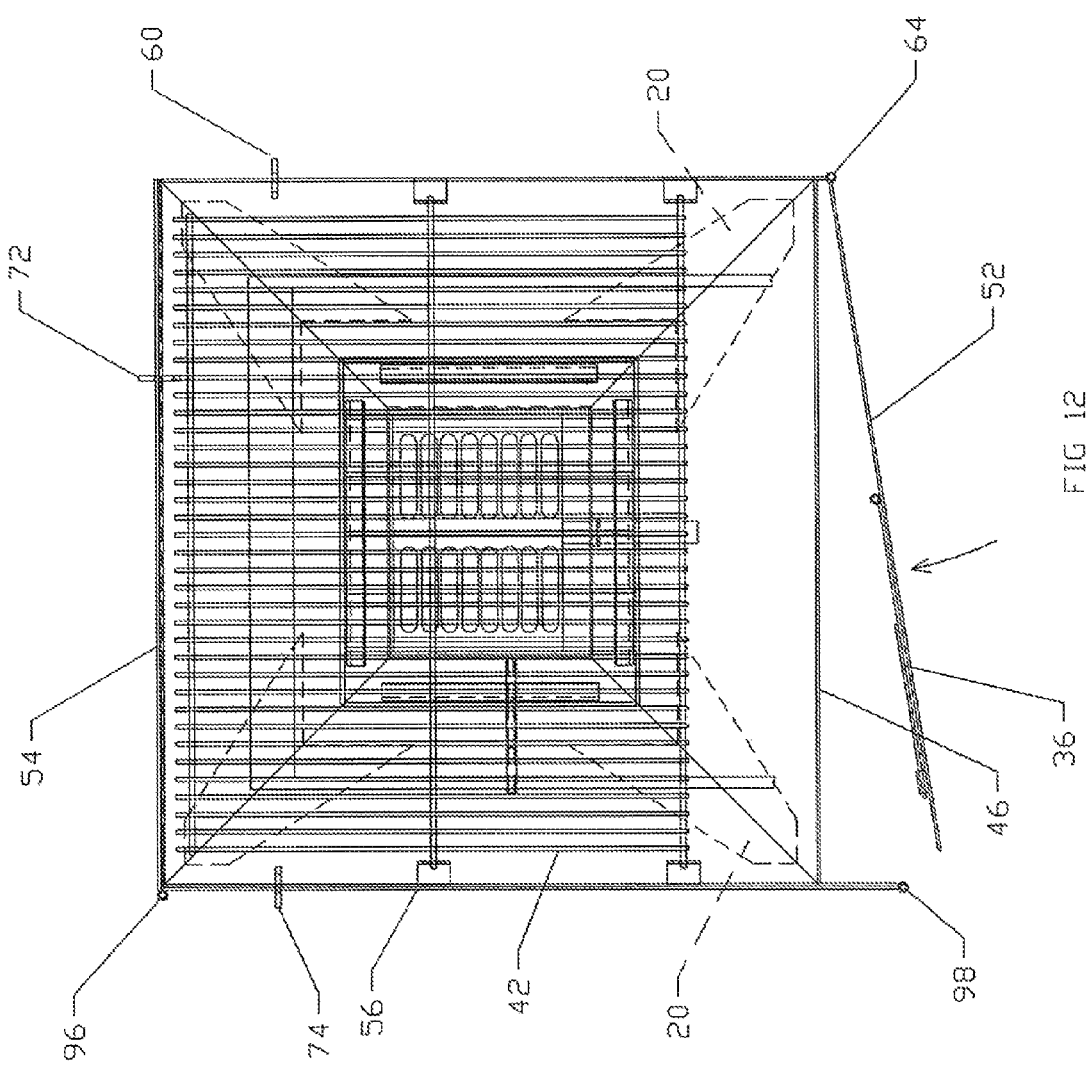
FIG. 12 is a view similar to FIG. 11, but showing a next step in the opening of the grill into the open fire pit configuration.
Figure 13:
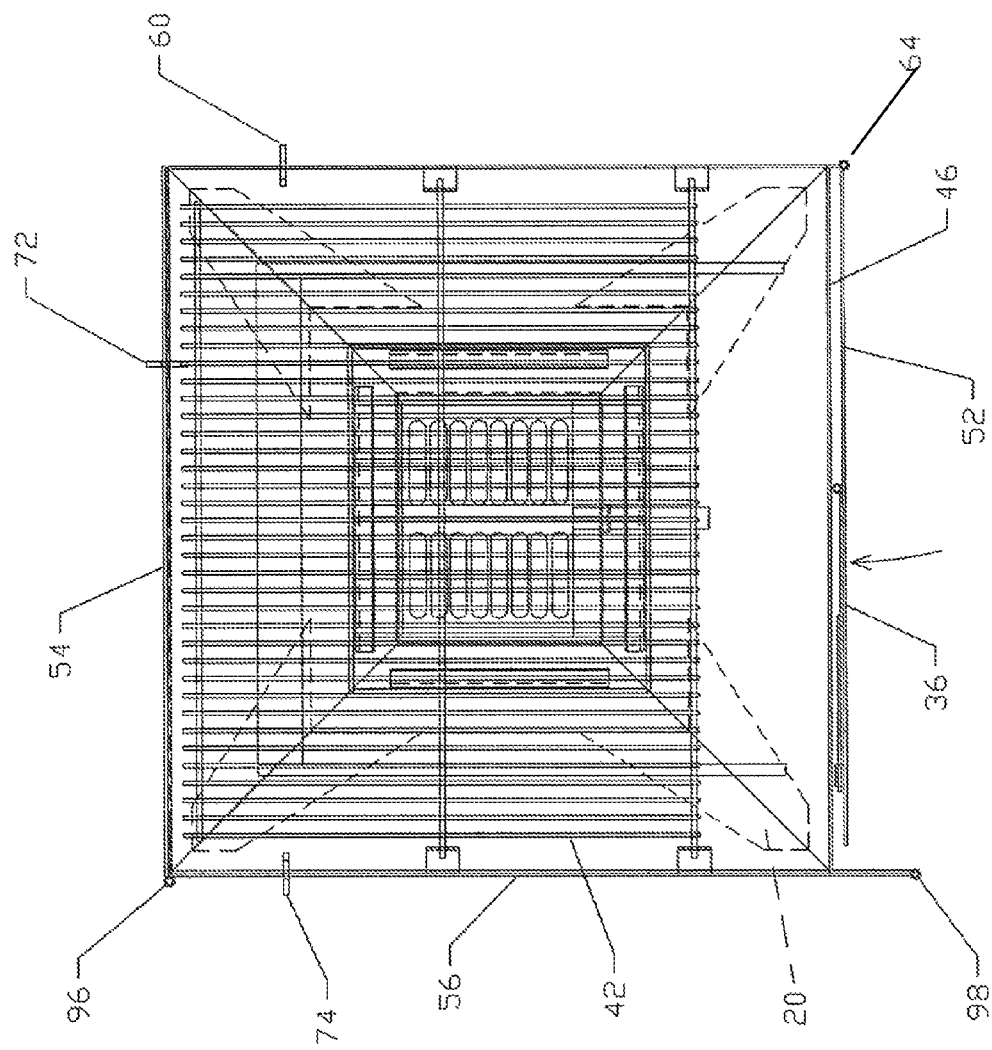
FIG. 13 is a view similar to FIG. 12, but showing a further step in the opening of the grill into the open fire pit configuration.

FIGS. 10-13 show the steps involved in stowing the left cover 52. First, the fuel access door 36, which is shown in the open position in FIG. 10, is closed against the left cover 52, as shown in FIG. 11. Next, grabbing the handle 58 (See FIG. 2), the user lifts slightly on the left cover 52 so that the cover 52 just clears the upwardly projecting tab 60, and the head of the button 62 on the left side is aligned with the large diameter portion of the keyhole opening 62A on the left cover 52 so the head of the button 62 passes through the keyhole opening 62A as the left cover 52 is opened. The user then swings the left cover 52 outwardly, pivoting about the vertical hinge 64. The left cover 52 is swung 270 degrees, until it is parallel with and adjacent to the rear wall 46 as shown in FIG. 13. Referring to FIGS. 36 and 37, it should be noted that the knuckles 116, 118 on the hinge 64 are spaced apart a sufficient distance to allow the knuckles 118 that are fixed to the left cover 52 to be lifted upwardly along the vertical hinge pin 120 relative to the fixed rear wall 46 and base 12.

Next, the user wants to open the front cover 54 outwardly toward the right of the grill 10. Looking at FIGS. 4 and 19, it can be seen that there is a cooking grid 42, which, on its front edge, is pivotably connected to the front cover 54, and, on its rear edge, is secured to hooks 66 that are fixed to the left and right fixed side walls 48, 50 of the grill 10. There is a vertical member 106 at the rear end of the cooking grid 42, which receives the hooks 66 to secure the rear of the cooking grid 42 to the fixed side walls 48, 50 of the grill 10. Since the front edge of the cooking grid 42 is secured to the front cover 54, and the rear edge of the cooking grid 42 is fixed to the fixed side walls 48, 50, the cooking grid 42 prevents the front cover 54 from being swung open. The user must therefore first disengage the rear end of the cooking grid 42 from the hooks 66 before he swings out the front cover 54. To accomplish this, the user opens the lid 68 (and latches it in the open position as will be described later) and reaches in to grab and lift the rear edge of the cooking grid 42 so as to disengage the vertical member 106 from the hooks 66 as shown in FIG. 20.

Figure 14:
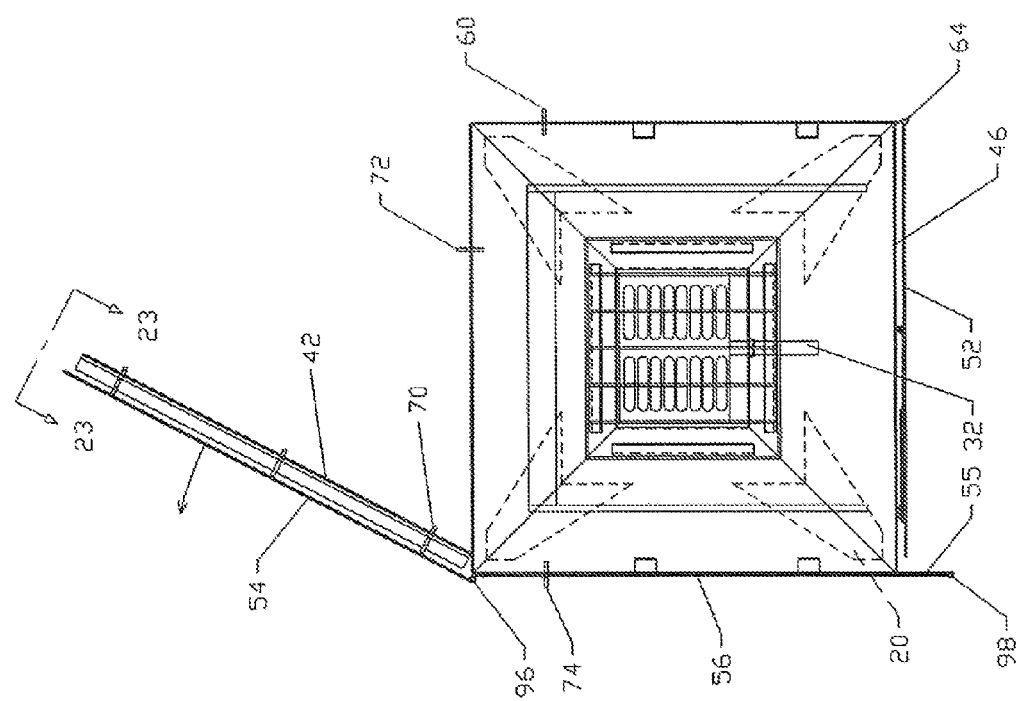
FIG. 14 is a view similar to FIG. 13, but showing another step in the opening of the grill into the open fire pit configuration.

The user grasps the handle 58 on the front cover 54 and slightly lifts the front cover 54, so as to clear the clip 72 (See FIG. 4), and swings the front cover 54 outwardly toward the right side of the grill 10, as shown in FIGS. 14 and 21. The right front hinge 96 between the front cover 54 and the right side cover 56 has the same type of arrangement described with respect to the left rear hinge 64, which allows the front cover 54 to be lifted up relative to the right cover 56.

As the user swings the front cover 54 outwardly, toward the right side of the grill, as shown in FIG. 21, the user slowly lowers the cooking grid 42, as shown in FIG. 22, from its initial horizontal orientation to a vertical orientation, adjacent to the interior of the front cover 54, as shown in FIGS. 14 and 23. Note that the cooking grid 42 rests on supporting hooks 70 on the front cover 54, which not only allows the cooking grid 42 to pivot from the horizontal orientation of FIG. 19 to the vertical orientation of FIG. 23, but also allow the user to completely remove the cooking grid 42 when desired, such as when using the cooking pot configuration, as described later.

Figure 16:
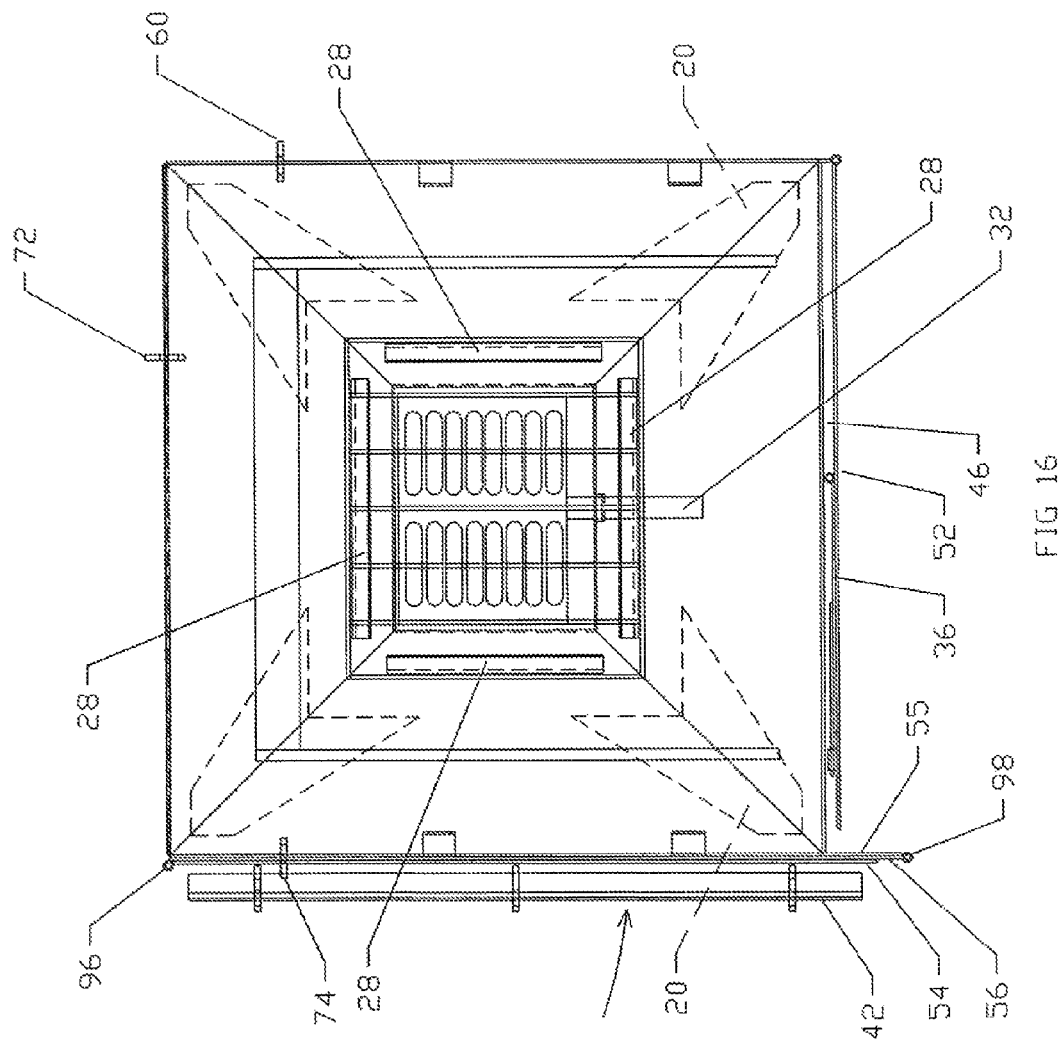
FIG. 16 is a view similar to FIG. 15, but showing another step in the opening of the grill into the open fire pit configuration.
Figure 17:
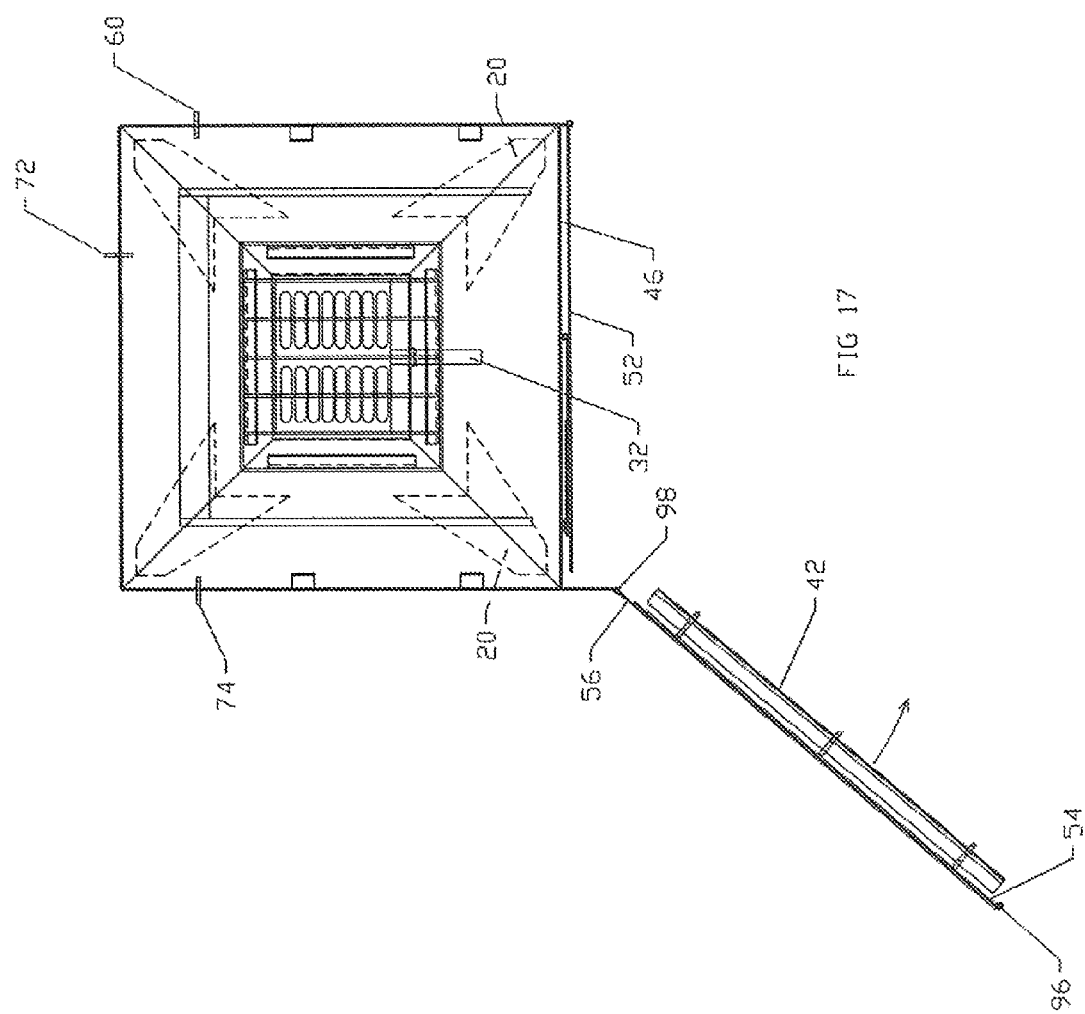
FIG. 17 is a view similar to FIG. 16, but showing another step in the opening of the grill into the open fire pit configuration.
Figure 18:
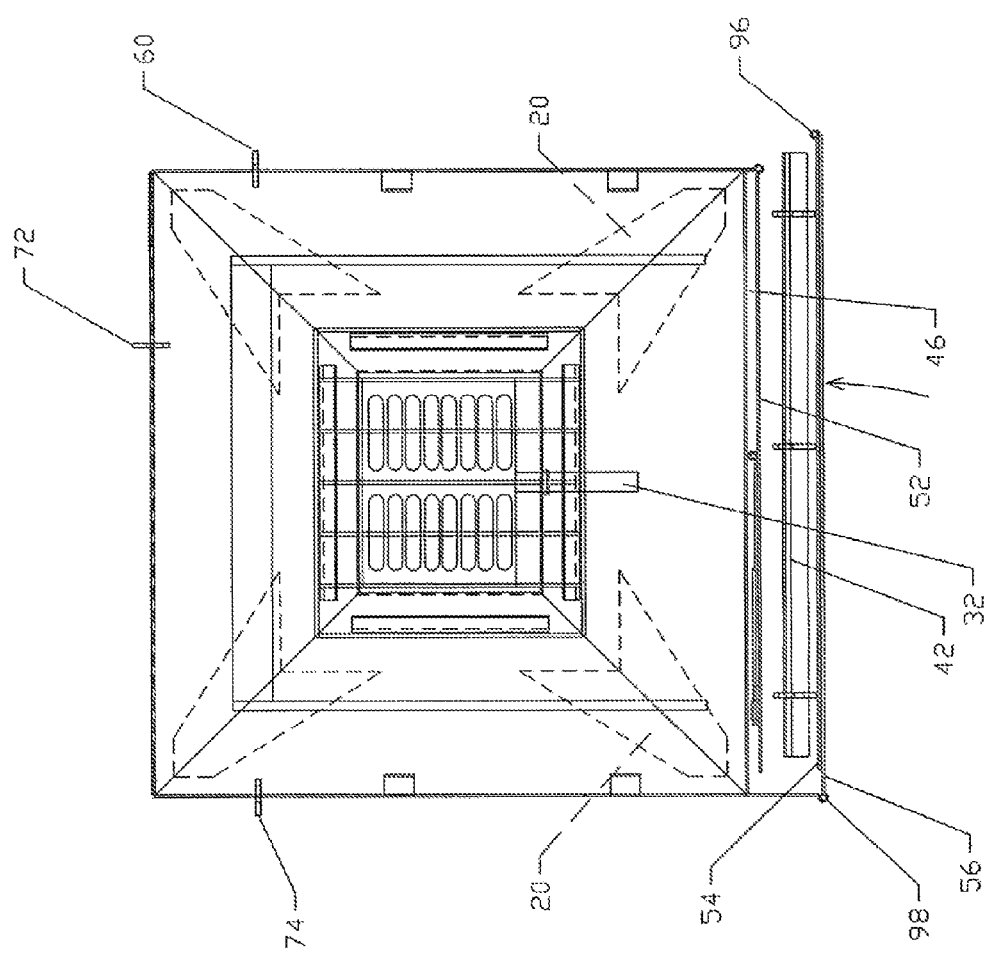
FIG. 18 is a view similar to FIG. 17, but showing a final step in the opening of the grill into the open fire pit configuration.

Once the cooking grid 42 is vertically stowed adjacent to the front cover 54 (as shown in FIGS. 14 and 23), the user continues to swing the front cover 54 about the right front hinge 96, as shown in FIG. 15, until it is stowed against the right cover 56, as shown in FIG. 16. Then, both front and right covers 54, 56 are lifted up slightly along the right rear hinge 98, such that the right cover 56 clears the upwardly projecting tab 74 at the bottom and is released from the button 62 at the top (See FIG. 4), and both the front and right side covers 54, 56 are held together and are swung out to the right and towards the back, pivoting about the right rear hinge 98, as shown in FIG. 17. After 270 degrees of rotation, the front and right covers 54, 56 are stowed flat against the left cover 52, parallel to the rear wall 46, as shown in FIG. 18. It should be noted that the rearwardly projecting plate 55 causes the right rear hinge 98 to be located a sufficient distance rearwardly of the rear wall 46 to provide space for the grid 42 and front cover 54.

Figure 4:
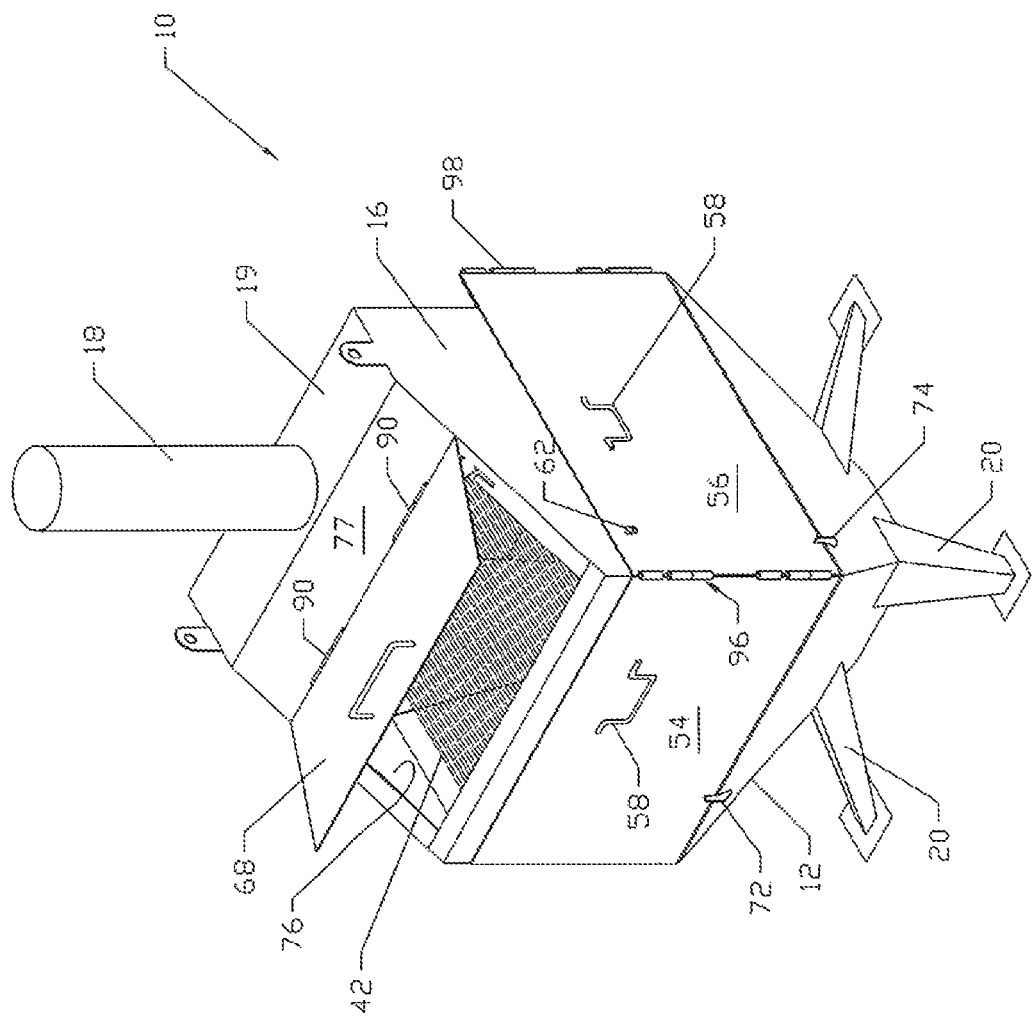
FIG. 4 is the same view as FIG. 1 but with the grill lid open.

The user then closes the lid 68 to complete the conversion of the grill 10 from a grill configuration (as shown in FIG. 4) to an open fire pit configuration (as shown in FIGS. 8 and 9). In this configuration, the upper body portion 16 serves as a hood, collecting the fumes from the fire and venting them through the chimney 18.

Referring to FIG. 8, the upper portion 16 of the grill 10 includes the lid 68 which rests upon the slanted top wall 77 of the grill 10. This top wall 77 defines the opening 76 which is covered by the lid 68. The lid 68 is pivotably mounted to the wall 77 via horizontally oriented hinges 90 which allow the lid 68 to be opened or closed.

There is a mechanism that makes it easy to hold the lid 68 in the "open" position, which is shown in FIG. 8 and shown in detail in FIGS. 24-28. On each of the left and right sides of the top wall 77 in the area covered by the lid 68 are two linearly aligned slotted openings 78, 80, separated by a small bridge 81. Secured to the bottom surface of the lid 68 are two downwardly projecting tabs 82. A pivoting latch 84 is mounted on each of the tabs 82. Each latch 84 includes a short projection 88 and a long projection 86.

As shown in FIG. 24, when the lid 68 is closed, the latches 84 are inside the grill 10, projecting through the lower slotted openings 80. As the user raises the lid 68, the latches 84 begin to rise up through the lower openings 80, as shown in FIGS. 25 and 26. Once the short projection 88 of each latch 84 clears the top wall 77, the weight of the latch 84 causes it to pivot, so the short projection slides up along the bridge 81, as shown in FIG. 27. Once the short projection 88 reaches the upper slotted opening 78, the user releases the lid 68, which falls forward slightly, allowing the short projection 88 to enter the upper slotted opening 78, as shown in FIG. 28. The lowering lid 68 then causes the short projection 88 to impact against the upper edge of the bridge 81, holding the lid 68 in the open position as shown in FIGS. 29 and 4. The latch 84 is weighted and mounted on the lid 68 such that it naturally pivots in the desired direction to ensure that the short projection aligns with the upper slotted opening 78 when the lid 68 is opened.

To close the lid 68, the user lifts the lid 68 until the short projection 88 exits the upper slotted opening 78. He then manually pivots the latches 84 in the opposite direction until the short projections 88 are riding on top of their respective bridges 81. Further lowering of the lid 68 results in the latches 84 falling through their respective lower slotted openings 80, allowing the lid 68 to fully close.

FIG. 1 shows the grill 10 in the fully enclosed, grill configuration. As shown in FIG. 4, in this configuration, the cooking grid 42 is installed with the front edge of the cooking grid 42 resting on the hooks 70 of the front cover 54 (See FIG. 19) and the rear edge of the cooking grid 42 resting on the hooks 66. This arrangement not only secures the cooking grid 42 inside the grill 10; it also holds the upper edge of the front cover 54 tightly closed. The lower edge of the front cover 54 is held tightly against the grill 10 by the clip 72 as shown in FIGS. 1 and 4.

Figure 5:
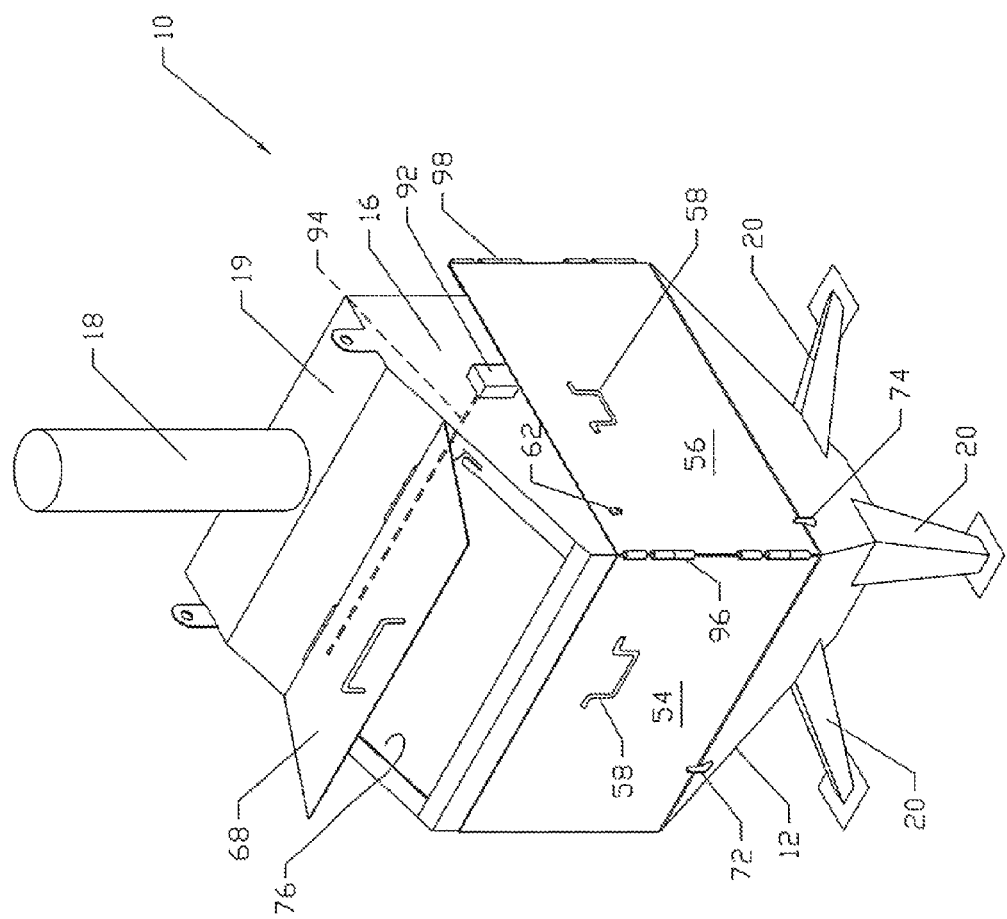
FIG. 5 is the same view as FIG. 4, but with the cooking grid removed and a rotisserie added.

FIG. 5 shows the grill 10 with a rotisserie attachment which includes a motor 92 and a long, solid rod 94 which is rotated by the motor 92. The motor 92 may be powered by batteries or by electricity from an electrical outlet.

Figure 6:
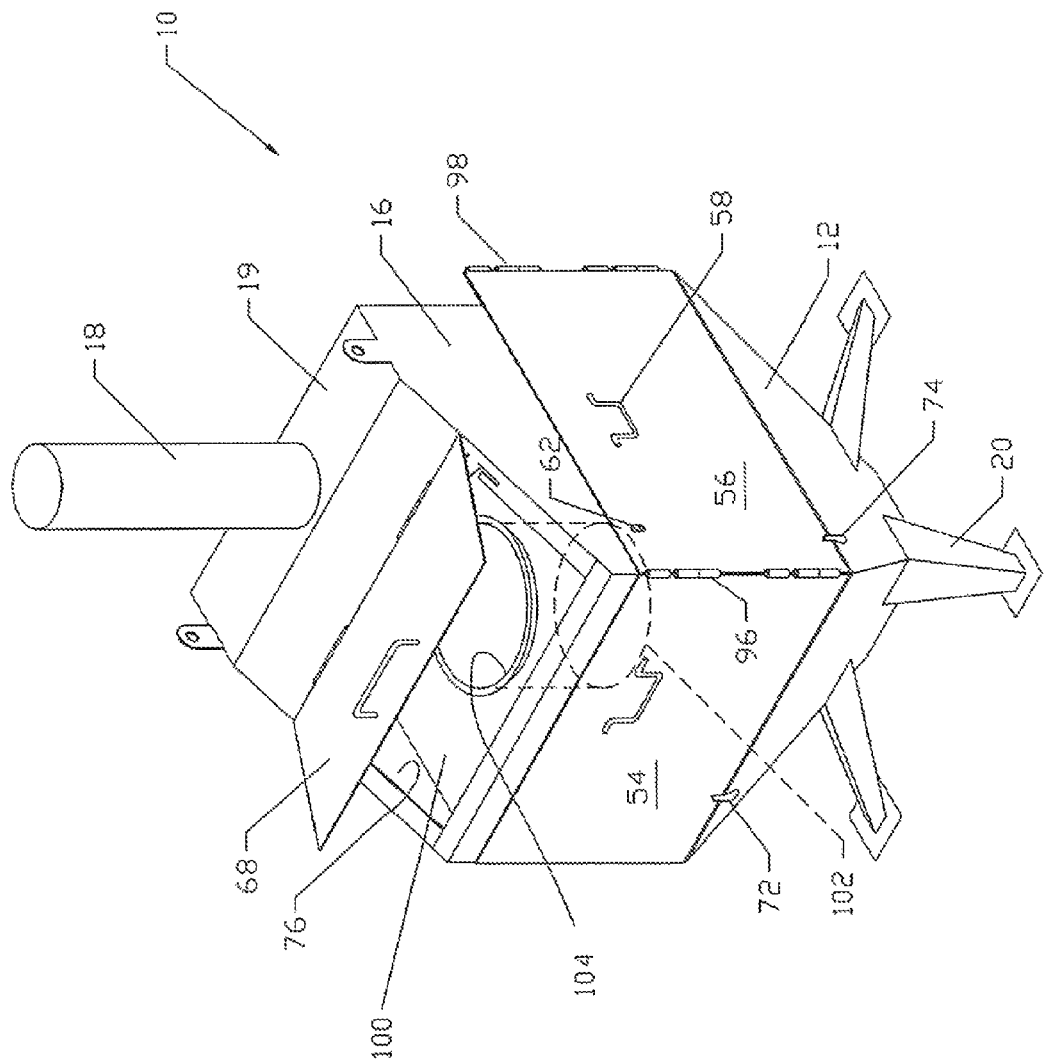
FIG. 6 is the same view as FIG. 4, but with the cooking grid replaced by a plate supporting a cooking pot.

FIG. 6 shows the grill 10 in the enclosed configuration, but with a solid plate 100 having an opening 104 that receives a cooking pot 102 instead of the grill plate 42 of FIG. 4. The top edge of the cooking pot 102 has a larger outside diameter than the opening 104, so that larger diameter portion rests on the top surface of the plate 100. (The pot 102 may alternatively have handles that extend beyond the opening 104 and that rest on the top surface of the plate 100.) The cooking pot attachment plate 100 mounts in the same manner as the grid 42 and is designed as a direct replacement of the grid 42 when using the grill 10 in the pot cooker configuration shown in FIG. 6.

Figure 7:
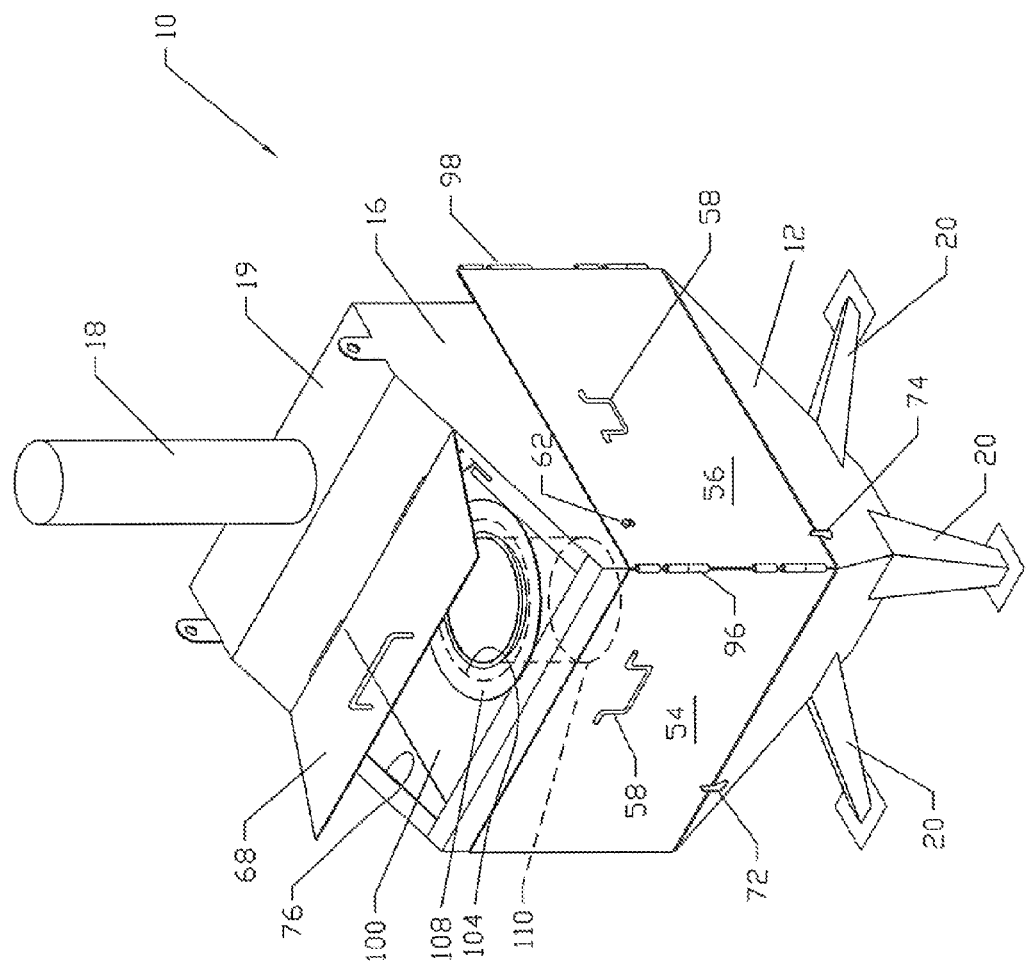
FIG. 7 is the same view as FIG. 6, but with an adapter ring inserted to support a smaller cooking pot.

FIG. 7 shows a slight modification to the pot cooker configuration of FIG. 6. In this arrangement, an adapter ring 108 is used to effectively reduce the diameter of the opening in the plate 100 so it can support a smaller diameter pot. The adapter ring 108 has an outside diameter which is larger than the opening 104 of the cooking pot attachment plate 100, and an inside diameter sized to receive the smaller pot 110.

When the grill 10 is fully enclosed, as shown in FIG. 1, it is in a conventional grill configuration. The food to be cooked is place on top of the grid 42 via the opening 76 (See FIG. 7), which is exposed when the lid 68 is raised. Fuel for the grill 10 may be added via the fuel access door 36, and the amount of combustion air may be regulated via the air vent mechanism 40 (See FIGS. 2 and 3) and through the adjustment of the upper plate 26 relative to the lower plate 21 (See FIG. 19) to adjust the slotted openings 30 (See FIG. 15). In the fully closed configuration shown in FIG. 1, and with the combustion air vents substantially closed, the grill 10 can be used as a smoker.

In this same configuration, a rotisserie 92 (See FIG. 5) may be added to the grill 10. The cooking pot attachment plate 100 (See FIGS. 6 and 7) may be used instead of the grid 42 to convert the grill 10 to a pot cooker configuration. The adapter ring 108 (See FIG. 7) may be used with the cooking pot attachment 100 for use with smaller cooking pots 110.

To convert the grill 10 from the enclosed, conventional grill configuration to the open fire pit configuration, the covers 52, 54, 56 are folded back against the rear wall 46 of the grill 10, resulting in a large vertical opening 44 between the upper portion 16 and the base 12 along the front and most of the left and right sides, as shown in FIGS. 8 and 9.

The grid 42 is interchangeable with the cooking pot attachment 100, and either one may be supported vertically against the front cover 54 when the grill 10 is opened up to the fire pit configuration, thus keeping substantially all the major components of the grill 10 on the grill 10 as it is converted to its multiple configurations.

It will be obvious to those skilled in the art that modifications may be made to the embodiments described above without departing from the scope of the present invention.

The claims are as follows:

1. A grill, comprising:
   a base, including a body defining a bottom, and front, rear, left and right sides, said body having a concave upper surface for supporting a material to be burned;
   a fixed wall fixedly attached to said rear side of said base;
   an upper body portion supported on and fixed in a stationary manner to said base by means of said fixed wall, said upper body portion being spaced vertically above said base so as to define a vertical gap between the upper body portion and the base on at least the front, left, and right sides;
   said upper body portion having a top wall defining a top opening; and a movable lid selectively covering said top opening; and
   a substantially solid movable covering mounted to selectively open and close the vertical gap between the upper body portion and the base on the front, left and right sides; wherein said substantially solid movable covering includes a plurality of covers, wherein at least two of said covers are hinged to each other.

2. A grill as recited in claim 1, wherein said movable covering defines a fuel access opening that is large enough to permit logs to pass through the closed movable covering into the base, and further comprising a fuel access door mounted on said movable covering for selectively opening and closing the fuel access opening.

3. A grill as recited in claim 2, wherein said upper body portion further defines a chimney.

4. A grill as recited in claim 2, wherein the fixed wall extends across the rear of the base, and wherein said movable covering includes a left cover pivotably mounted on said fixed wall for pivoting about a vertical axis; a right cover pivotably mounted on said fixed wall for pivoting about a vertical axis; and a front cover pivotably mounted on one of said left and right covers.

5. A grill as recited in claim 4, and further comprising a plurality of upwardly projecting tabs on said base which receive the movable covering and hold the bottom edge of the movable covering inwardly.

6. A grill as recited in claim 5, and further comprising a grill plate, including means for mounting said grill plate to the upper body portion and to the front cover.

7. A grill as recited in claim 6, and further comprising a pot supporting plate, which defines an opening for receiving a pot and includes means for mounting to the upper body portion and to the front cover.

8. A grill as recited in claim 7, and further comprising a rotisserie attachment including means for mounting the rotisserie attachment to the upper body portion.

9. A grill as recited in claim 4, wherein the base has a rectangular horizontal cross-section that is larger at the top and smaller at the bottom.

10. A grill as recited in claim 9, wherein the upper body portion also has a rectangular horizontal cross section, and wherein the bottom of the upper body portion has the same dimensions as and is located directly above the top of the base.

11. A grill as recited in claim 10, and further comprising means for holding said lid in the open position.

12. A grill as recited in claim 11, and further comprising legs extending downwardly from said base and spacing said base above ground level.

* * * * *